United States Patent
Nagasaka et al.

(10) Patent No.: US 10,057,810 B2
(45) Date of Patent: Aug. 21, 2018

(54) COMMUNICATION SYSTEM, CELLULAR BASE STATION, AND WLAN ACCESS POINT

(71) Applicant: KYOCERA CORPORATION, Kyoto (JP)

(72) Inventors: Yushi Nagasaka, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/480,603

(22) Filed: Apr. 6, 2017

(65) Prior Publication Data

US 2017/0215106 A1   Jul. 27, 2017

Related U.S. Application Data

(63) Continuation of application No. 15/251,333, filed on Aug. 30, 2016, now Pat. No. 9,629,026, which is a (Continued)

(30) Foreign Application Priority Data

Mar. 20, 2014   (JP) ................................. 2014-059278
Nov. 27, 2014   (JP) ................................. 2014-240644

(51) Int. Cl.
*H04L 5/00* (2006.01)
*H04W 28/08* (2009.01)
(Continued)

(52) U.S. Cl.
CPC .......... *H04W 28/08* (2013.01); *H04L 5/0058* (2013.01); *H04W 72/0406* (2013.01);
(Continued)

(58) Field of Classification Search
CPC ...... H04L 5/0058; H04W 84/12; H04W 76/06
See application file for complete search history.

(56) References Cited

U.S. PATENT DOCUMENTS 9,629,026 B2 *   4/2017  Nagasaka .............. H04W 28/08
2009/0219896 A1 *   9/2009  Hakuli .................. H04W 36/10
                                                            370/335
(Continued)

FOREIGN PATENT DOCUMENTS

EP         2 704 481 A1    3/2014
JP       2013-520096 A     5/2013
(Continued)

OTHER PUBLICATIONS

The extended European search report issued by the European Patent Office dated Nov. 3, 2017, which corresponds to European Patent Application No. 15765345.2-1854 and is related to U.S. Appl. No. 15/480,603.

(Continued)

*Primary Examiner* — Raj Jain
(74) *Attorney, Agent, or Firm* — Studebaker & Brackett PC

(57) ABSTRACT

A communication system according to an embodiment includes: a cellular base station; and a wireless local area network (WLAN) management apparatus configured to manage one or more WLAN access points. The WLAN management apparatus is used for a cellular-WLAN aggregation in which data of a user terminal is transmitted and received using both a cellular communication and a WLAN communication while the user terminal maintains a radio resource control (RRC) connection with the cellular base station. A direct communication path bypassing a core network is established between the cellular base station and the WLAN management apparatus.

3 Claims, 10 Drawing Sheets

Related U.S. Application Data continuation of application No. PCT/JP2015/058589, filed on Mar. 20, 2015.

(51) Int. Cl.

| | | |
|---|---|---|
| H04W 76/27 | (2018.01) |
| H04W 76/16 | (2018.01) |
| H04W 76/12 | (2018.01) |
| H04W 76/15 | (2018.01) |
| H04W 72/04 | (2009.01) |
| H04W 76/02 | (2009.01) |
| H04W 84/02 | (2009.01) |
| H04W 76/04 | (2009.01) |
| H04W 76/11 | (2018.01) |
| H04W 92/02 | (2009.01) |
| H04W 92/20 | (2009.01) |
| H04W 84/04 | (2009.01) |
| H04W 84/12 | (2009.01) |
| H04W 88/16 | (2009.01) |
| H04W 36/22 | (2009.01) |
| H04W 88/06 | (2009.01) |

(52) U.S. Cl.
CPC ....... *H04W 76/022* (2013.01); *H04W 76/025* (2013.01); *H04W 76/026* (2013.01); *H04W 76/046* (2013.01); *H04W 76/12* (2018.02); *H04W 76/15* (2018.02); *H04W 76/16* (2018.02); *H04W 76/27* (2018.02); *H04W 84/02* (2013.01); *H04W 36/22* (2013.01); *H04W 76/021* (2013.01); *H04W 76/11* (2018.02); *H04W 84/042* (2013.01); *H04W 84/12* (2013.01); *H04W 88/06* (2013.01); *H04W 88/16* (2013.01); *H04W 92/02* (2013.01); *H04W 92/20* (2013.01)

(56) References Cited

U.S. PATENT DOCUMENTS

| | | | | |
|---|---|---|---|---|
| 2010/0165940 A1* | 7/2010 | Watfa | ............ | H04W 8/08 370/329 |
| 2011/0292914 A1* | 12/2011 | Sachs | ............ | H04W 36/0016 370/332 |
| 2012/0163336 A1* | 6/2012 | Adjakple | ............ | H04W 12/04 370/331 |
| 2013/0051309 A1* | 2/2013 | Van Phan | ............ | H04B 7/15592 370/315 |
| 2013/0083783 A1* | 4/2013 | Gupta | ............ | H04W 4/70 370/338 |
| 2013/0176988 A1 | 7/2013 | Wang et al. | | |
| 2014/0369198 A1* | 12/2014 | Rinne | ............ | H04W 40/02 370/235 |
| 2015/0003435 A1* | 1/2015 | Horn | ............ | H04L 5/0058 370/338 |
| 2015/0043532 A1 | 2/2015 | Adachi et al. | | |
| 2015/0065130 A1 | 3/2015 | Inakoshi | | |
| 2015/0117310 A1* | 4/2015 | Zexian | ............ | H04L 45/245 370/328 |
| 2015/0139184 A1 | 5/2015 | Wang | | |
| 2015/0327150 A1* | 11/2015 | Jung | ............ | H04W 36/14 370/254 |

FOREIGN PATENT DOCUMENTS

| | | |
|---|---|---|
| WO | 2013/137461 A1 | 9/2013 |
| WO | 2013137265 A1 | 9/2013 |
| WO | 2013185653 A1 | 12/2013 |

OTHER PUBLICATIONS

Intel Corporation et al.; New WI Proposal: LTE-WLAN Radio Level Integration and Interworking Enhancement; 3GPP TSG RAN Meeting #67 RP-150510; Mar. 9-12, 2015; XP055412110; Shanghai, China.
International Search Report issued in PCT/JP2015/058589; dated Jun. 2, 2015.
Written Opinion issued in PCT/JP2015/058589; dated Jun. 2, 2015.
3rd Generation Partnership Project; Technical Specification Group Radio Access Network; Study on Wireless Local Area Network (WLAN)—3GPP radio interworking; 3GPP TR 37.834; V12.0.0; Dec. 2013; pp. 1-17; Release 12; 3GPP Organizational Partners.
Samsung; Load balancing between 3GPP and WLAN; 3GPP TSG-RAN2 Meeting #81bis; R2-131181; Apr. 15-19, 2013; pp. 1-4; Chicago, IL, USA.
CMCC; Network Selection for WLAN/3GPP Radio Interworking; 3GPP TSG-RAN WG2 Meeting #81bis; R2-130973; Apr. 15-19, 2013; pp. 1-4; Chicago, USA.

\* cited by examiner

TRAFFIC STEERING FOR OFFLOAD/ONLOAD AND LOAD BALANCING BETWEEN NODES

COMMUNICATION SYSTEM, CELLULAR BASE STATION, AND WLAN ACCESS POINT

CROSS REFERENCE TO RELATED APPLICATIONS

This application is a Continuation application of U.S. patent application Ser. No. 15/251,333, filed Aug. 30, 2016, which is a Continuation application of International Application No. PCT/JP2015/058589, filed Mar. 20, 2015, which claims benefit of Japanese Patent Application No. 2014-059278, filed Mar. 20, 2014, and Japanese Patent Application No. 2014-240644, filed Nov. 27, 2014, the entire contents of which are incorporated herein by reference.

TECHNICAL FIELD

The present disclosure relates to a communication system including a cellular base station and a WLAN access point.

BACKGROUND ART

In recent years, user terminals having both a cellular communication function and a wireless local area network (WLAN) communication function have been spread. Further, WLAN access points managed by an operator of a cellular communication network are increasingly used. In this regard, a technique of enhancing interworking of a cellular radio access network (RAN) and a WLAN is under review in 3rd Generation Partnership Project (3GPP).

For example, it is possible to reduce a traffic load of the cellular RAN by transferring traffic (data) transmitted and received by the user terminal from the cellular RAN to the wireless LAN (off load). Further, a network selection scheme for selecting an access network of accommodating traffic of the user terminal from the cellular RAN and the wireless LAN has been proposed (see Non-Patent Literature 1).

CITATION LIST

Non Patent Literature

Non patent Literature 1: 3GPP Written Contribution "TR37.834 V12.0.0," December, 2013

SUMMARY

An interworking method that is currently under review is a method in which a cellular base station provides auxiliary information to a user terminal, and the user terminal transfers traffic from the cellular base station to a WLAN access point based on the auxiliary information.

However, in the interworking method that is currently under review, the cellular base station and the WLAN access point operate individually and independently, and there is a problem in that it is difficult to implement advanced communication control in which the cellular base station and the WLAN access point collaborate with each other.

In this regard, it is an object of the present disclosure to provide a communication system, a cellular base station, and a WLAN access point, which are capable of implementing the advanced communication control in which the cellular base station and the WLAN access point collaborate with each other.

A cellular base station comprises a controller configured to perform communications with a wireless local area network (WLAN) management apparatus that manages WLAN access points, wherein the WLAN management apparatus is used for a cellular-WLAN aggregation in which data of a user terminal is transmitted and received using both a cellular communication and a WLAN communication while the user terminal maintains a radio resource control (RRC) connection with the cellular base station, and wherein a direct communication path bypassing a core network is established between the cellular base station and the WLAN management apparatus. The controller comprises a packet data convergence protocol (PDCP) entity configured to generate PDCP packets by ciphering data of a specific bearer to be used for the cellular-WLAN aggregation; a radio link control (RLC) entity positioned as a cellular lower layer than the PDCP entity; and a capsulation entity, wherein the PDCP entity is further configured to selectively provide one of the RLC entity and the capsulation entity with PDCP packets, and the capsulation entity is configured to encapsulate the provided PDCP packets, and to use the direct communication path to transmit the encapsulated PDCP packets to the WLAN management apparatus.

A device provided in a cellular base station comprises a processor and a memory, the processor configured to perform communications with a wireless local area network (WLAN) management apparatus that manages WLAN access points, wherein the WLAN management apparatus is used for a cellular-WLAN aggregation in which data of a user terminal is transmitted and received using both a cellular communication and a WLAN communication while the user terminal maintains a radio resource control (RRC) connection with the cellular base station, and wherein a direct communication path bypassing a core network is established between the cellular base station and the WLAN management apparatus. The processor comprises a packet data convergence protocol (PDCP) entity configured to generate PDCP packets by ciphering data of a specific bearer to be used for the cellular-WLAN aggregation; a radio link control (RLC) entity positioned as a cellular lower layer than the PDCP entity; and a capsulation entity, wherein the PDCP entity is further configured to selectively provide one of the RLC entity and the capsulation entity with PDCP packets, and the capsulation entity is configured to encapsulate the provided PDCP packets, and to use the direct communication path to transmit the encapsulated PDCP packets to the WLAN management apparatus.

A method performed at a cellular base station comprises performing communications with a wireless local area network (WLAN) management apparatus that manages WLAN access points, wherein the WLAN management apparatus is used for a cellular-WLAN aggregation in which data of a user terminal is transmitted and received using both a cellular communication and a WLAN communication while the user terminal maintains a radio resource control (RRC) connection with the cellular base station, and wherein a direct communication path bypassing a core network is established between the cellular base station and the WLAN management apparatus; generating, at a packet data convergence protocol (PDCP) entity of the cellular base station, PDCP packets by ciphering data of a specific bearer to be used for the cellular-WLAN aggregation; selectively providing, at the PDCP entity, one of a radio link control (RLC) entity and a capsulation entity with PDCP packets, the RLC entity positioned as a cellular lower layer than the PDCP entity; encapsulating, at the capsulation entity, the provided PDCP packets; and using, at the capsulation entity, the direct communication path to transmit the encapsulated PDCP packets to the WLAN management apparatus.

DESCRIPTION OF EMBODIMENTS

Overview of Embodiments

Figure 1:
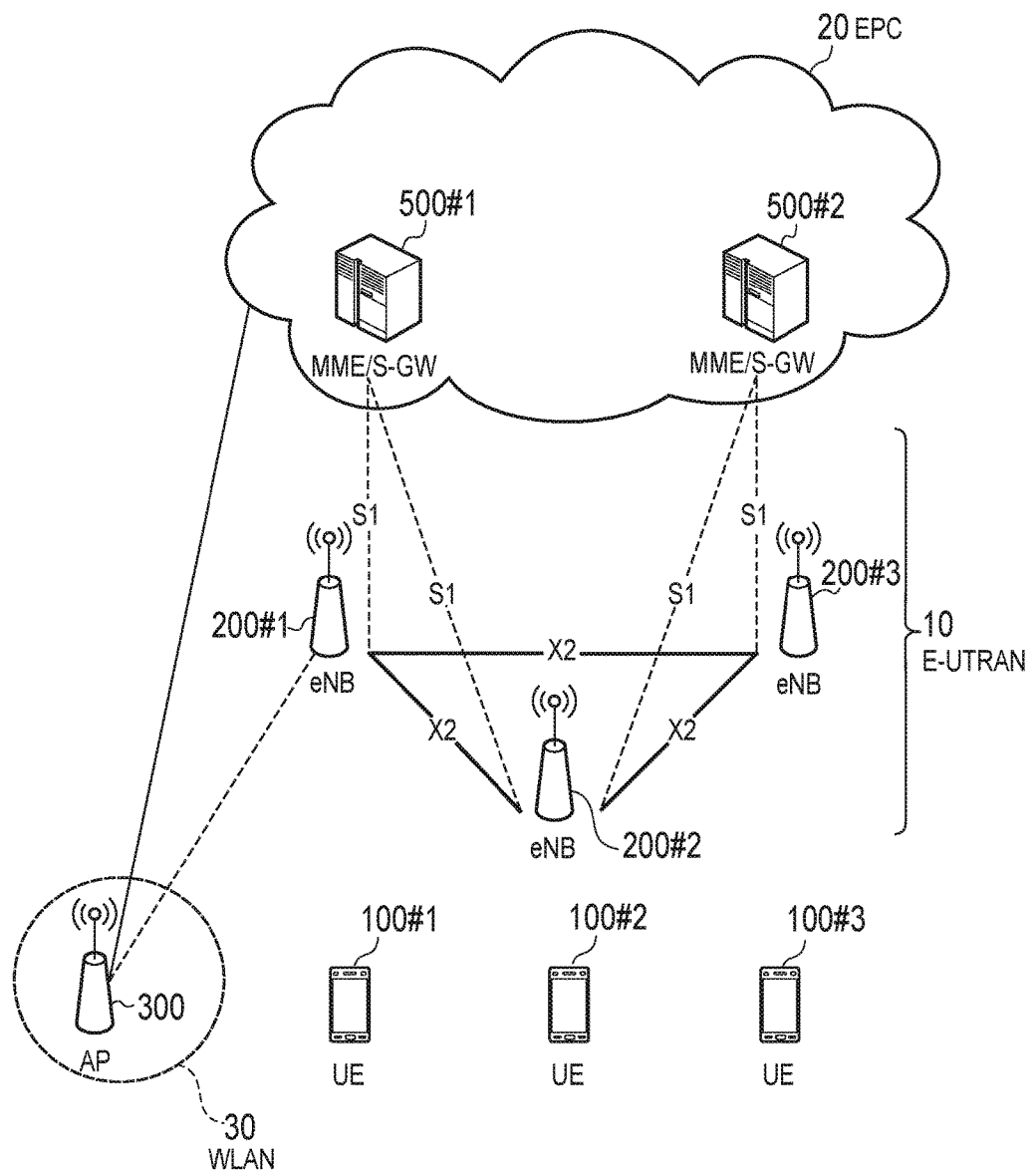
FIG. 1 is a diagram illustrating a communication system according to a first embodiment.

A communication system according to a first embodiment includes: a cellular base station connected to a backhaul network; and a WLAN access point. A direct communication path bypassing a core network is established between the cellular base station and the WLAN access point. The cellular base station performs communication control in collaboration with the WLAN access point using the direct communication path.

In the first embodiment, the cellular base station performs, based on information of the WLAN access point acquired using the direct communication path, at least one of: first control for transferring traffic of a user terminal from the cellular base station to the WLAN access point; and second control for returning the traffic from the WLAN access point to the cellular base station.

In the first embodiment, when the direct communication path is established between the cellular base station and each of a plurality of WLAN access points, the cellular base station selects the WLAN access point serving as a candidate of the first control or the second control among the plurality of WLAN access points based on the information of the WLAN access point of each of the plurality of WLAN access points acquired using the direct communication path.

In the first embodiment, the cellular base station receives measurement information of a radio signal transmitted from at least one of the plurality of WLAN access points from a user terminal in its own cell. When the direct communication path is established between the cellular base station and each of the plurality of WLAN access points, the cellular base station selects the WLAN access point serving as a candidate of the first control or the second control among the plurality of WLAN access points based on the information of the WLAN access point of each of the plurality of WLAN access points acquired using the direct communication path and the measurement information.

In the first embodiment, the information of the WLAN access point is load information of the WLAN access point.

In the first embodiment, the cellular base station receives measurement information of a radio signal transmitted from at least one of the plurality of WLAN access points from a user terminal in its own cell. The cellular base station selects the WLAN access point serving as a candidate of the first control for transferring the traffic of the user terminal from the cellular base station to the WLAN access point or the second control for returning the traffic from the WLAN access point to the cellular base station among the plurality of WLAN access points based on the measurement information.

In a third embodiment, the cellular base station maintains an RRC connection for a user terminal having a radio connection with the cellular base station and a radio connection with the WLAN access point.

In the third embodiment, the cellular base station performs transmission and reception of data directly with the user terminal and performs transmission and reception of data indirectly with the user terminal through the WLAN access point.

In the third embodiment, a first data bearer with intervention of the cellular base station with no intervention of the WLAN access point and a second data bearer with intervention of the WLAN access point and the cellular base station are established between the user terminal and the core network. The cellular base station manages the first data bearer and the second data bearer.

In the third embodiment, the data is transmitted and received in an IP packet state in the second data bearer between the cellular base station and the WLAN access point.

In the third embodiment, in the second data bearer between the cellular base station and the WLAN access point, the data is transmitted and received in a state in which one of a PDCP packet processed in a PDCP function in the cellular base station, an RLC packet processed in an RLC function in the cellular base station, and a MAC packet processed in a MAC function in the cellular base station is encapsulated in an IP packet.

In the third embodiment, the second data bearer is divided into two bearers in the cellular base station. One of the two bearers terminates at the user terminal through the WLAN access point, and the other of the two bearers terminates at the user terminal with no intervention of the WLAN access point.

In the third embodiment, the WLAN access point includes an entity that controls a cellular-WLAN aggregation in which data of a user terminal connected to its own WLAN access point is transmitted and received using both cellular communication and WLAN communication. The cellular base station acquires predetermined information for setting the cellular-WLAN aggregation from the entity using the direct communication path.

In the third embodiment, the predetermined information is information indicating a frequency band in the WLAN communication to be used by the user terminal serving as a target of the cellular-WLAN aggregation.

In the third embodiment, the entity generates first setting information related to a setting of the cellular-WLAN aggregation in the user terminal, and transmits the first setting information to the cellular base station using the direct communication path. The cellular base station transmits a setting message including setting information in which the first setting information is integrated with second setting information related to the setting of the cellular-WLAN aggregation which is generated by the cellular base station to the user terminal.

In the third embodiment, the predetermined information is collation information allocated to the user terminal serving as a target of the cellular-WLAN aggregation target. The cellular base station transmits the collation information to the user terminal. The user terminal includes the collation information in a connection request to the WLAN access point, and transmits the connection request to the WLAN access point. When the collation information transmitted to the cellular base station is identical to the collation information received from the user terminal, the entity determines the user terminal of a transmission source of the connection request to be the target of the cellular-WLAN aggregation.

In the third embodiment, the cellular base station transmits collation information allocated to the user terminal serving as a target of the cellular-WLAN aggregation target to the user terminal. The cellular base station includes an execution request of the WLAN communication in the cellular-WLAN aggregation in the collation information, and transmits the collation information to the entity. The user terminal includes the collation information in a connection request to the WLAN access point, and transmits the connection request to the WLAN access point. When the collation information received from the cellular base station is identical to the collation information received from the user terminal, the entity determines the user terminal of a transmission source of the connection request to be the target of the cellular-WLAN aggregation.

In the third embodiment, the WLAN access point includes an entity that controls a cellular-WLAN aggregation in which data of a user terminal connected to its own WLAN access point is transmitted and received using both cellular communication and WLAN communication. The cellular base station transmits collation information allocated to the user terminal serving as a target of the cellular-WLAN aggregation to the user terminal. The cellular base station includes the collation information in an execution request of the WLAN communication in the cellular-WLAN aggregation, and transmits the execution request to the entity. The user terminal includes the collation information in a connection request to the WLAN access point, and transmits the connection request to the WLAN access point. When the collation information received from the cellular base station is identical to the collation information received from the user terminal, the entity determines the user terminal of a transmission source of the connection request to be the target of the cellular-WLAN aggregation.

In the third embodiment, the WLAN access point includes an entity that controls a cellular-WLAN aggregation in which data of a user terminal connected to its own WLAN access point is transmitted and received using both cellular communication and WLAN communication. When the user terminal performs the cellular-WLAN aggregation, the WLAN access point receives a data packet from the user terminal through the WLAN communication. The entity decides the cellular base station or a higher station of the WLAN access point as a transfer destination of the data packet based on the data packet transmitted from the user terminal.

In the third embodiment, the cellular base station transmits information indicating determination information for deciding the transfer destination of the data packet transmitted from the user terminal that is performing the cellular-WLAN aggregation to the entity using the direct communication path. The entity decides the cellular base station or the higher station of the WLAN access point as the transfer destination of the data packet based on the data packet and the determination information.

In the third embodiment, when a plurality of data bearers are established through the cellular base station, the cellular base station includes cellular side entities corresponding to the plurality of data bearers. When the transfer destination of the data packet transmitted from the user terminal is the cellular base station, the entity transfers the data packet to the cellular side entity corresponding to the data bearer to which the data packet belongs. The cellular side entity transfers a data packet received through the cellular communication in the cellular-WLAN aggregation and the data packet transferred from the entity to a higher layer.

In the third embodiment, the entity starts control for deciding the transfer destination of the data packet according to reception of an execution request of the WLAN communication in the cellular-WLAN aggregation for each user terminal, and ends the control for deciding the transfer destination of the data packet according to reception of an end request of the WLAN communication in the cellular-WLAN aggregation for the user terminal for each user terminal.

In the third embodiment, the cellular base station controls a cellular-WLAN aggregation in which data of a user terminal connected to its own cell is transmitted and received using both cellular communication and WLAN communication. The cellular base station transmits a bearer identifier indicating a data bearer used in the cellular-WLAN aggregation to the user terminal that performs the cellular-WLAN aggregation. The user terminal transmits a data packet belonging to the data bearer corresponding to the bearer identifier through the WLAN communication.

A cellular base station according to a first embodiment is connected to a backhaul network. The cellular base station includes a controller configured to set a direct communication path bypassing a core network between a WLAN access point connected to the backhaul network and the cellular base station. The controller performs communication control in collaboration with the WLAN access point using the direct communication path.

A WLAN access point according to a first embodiment is connected to a backhaul network. The WLAN access point includes a controller configured to perform a function of an entity that is a higher layer than a MAC layer in the WLAN access point and controls a cellular-WLAN aggregation in which data of a user terminal is transmitted and received using both cellular communication and WLAN communication. The entity performs transmission and/or reception of information related to the cellular-WLAN aggregation with the cellular base station using a direct communication path bypassing a core network, the direct communication path being set between a cellular base station connected to the backhaul network and its own access point.

A communication system according to a second embodiment includes: a cellular base station connected to a backhaul network; and a WLAN access point. The backhaul network includes a communication apparatus that accommodates the WLAN access point. A direct communication path bypassing a core network is established between the cellular base station and the communication apparatus. The cellular base station performs communication control in collaboration with the WLAN access point through the communication apparatus.

In the second embodiment, an inter-base station interface protocol serving as a protocol of an inter-cellular base station interface is applied to the direct communication path. The communication apparatus performs protocol conversion between the inter-base station interface protocol and a WLAN protocol.

In the second embodiment, when the communication apparatus accommodates a plurality of WLAN access points, the communication apparatus collectively manages the plurality of WLAN access points.

In the second embodiment, the cellular base station acquires load information of the WLAN access point through the communication apparatus.

In the second embodiment, the cellular base station performs at least one of control for transferring a traffic of a user terminal from the cellular base station to the WLAN access point or control for returning the traffic from the WLAN access point to the cellular base station based on the load information.

In the third embodiment, the cellular base station maintains an RRC connection for a user terminal having a radio connection with the cellular base station and a radio connection with the WLAN access point.

In the third embodiment, the cellular base station performs transmission and reception of data directly with the user terminal and performs transmission and reception of data indirectly with the user terminal through the communication apparatus and the WLAN access point.

In the third embodiment, a first data bearer with intervention of the cellular base station with no intervention of the WLAN access point and a second data bearer with intervention of the WLAN access point and the cellular base station are established between the user terminal and the core network. The cellular base station manages the first data bearer and the second data bearer.

In the third embodiment, the data is transmitted and received in an IP packet state through the communication apparatus in the second data bearer between the cellular base station and the WLAN access point.

In the third embodiment, in the second data bearer between the cellular base station and the WLAN access point, the data is transmitted and received in a state of a PDCP packet encapsulated in an IP packet through the communication apparatus.

In the third embodiment, the second data bearer is divided into two bearers in the cellular base station. One of the two bearers terminates at the user terminal through the WLAN access point, and the other of the two bearers terminates at the user terminal with no intervention of the WLAN access point.

In other embodiments, the communication apparatus includes an entity that controls a cellular-WLAN aggregation in which data of a user terminal connected to the WLAN access point is transmitted and received using both cellular communication and WLAN communication. The cellular base station acquires predetermined information for setting the cellular-WLAN aggregation from the entity using the direct communication path.

In other embodiments, the communication apparatus accommodates a plurality of WLAN access points. The predetermined information is information indicating at least one of an identifier of the WLAN access point to be connected with a user terminal serving as a target of the cellular-WLAN aggregation among the plurality of WLAN access points and a frequency band in the WLAN communication to be used by the user terminal.

In other embodiments, the communication apparatus includes an entity that controls a cellular-WLAN aggregation in which data of a user terminal connected to the WLAN access point is transmitted and received using both cellular communication and WLAN communication. When the user terminal performs the cellular-WLAN aggregation, the communication apparatus receives a data packet from the user terminal through the WLAN communication. The entity decides the cellular base station or a higher station of the communication apparatus as a transfer destination of the data packet based on the data packet of the user terminal.

A cellular base station according to a second embodiment is connected to a backhaul network including a communication apparatus that accommodates a WLAN access point. The cellular base station includes a controller configured to set a direct communication path bypassing a core network between the cellular base station and the communication apparatus. The controller performs communication control in collaboration with the WLAN access point using the direct communication path through the communication apparatus.

First Embodiment

Hereinafter, exemplary embodiments in which an LTE system serving as a cellular communication system based on the 3GPP standard collaborates with a wireless LAN (WLAN) system will be described with reference to the appended drawings.

FIG. 1 is a diagram illustrating a communication system according to the first embodiment. The communication system includes a plurality of user equipments (UEs) 100, an evolved-UMTS terrestrial radio access network (E-UTRAN) 10, and an evolved packet core (EPC) 20 as illustrated in FIG. 1.

The E-UTRAN 10 corresponds to a cellular RAN. The EPC 20 corresponds to a core network. The E-UTRAN 10 and the EPC 20 constitutes a network of the LTE system.

The UE 100 is a mobile radio communication apparatus and corresponds to a user terminal. The UE 100 is a terminal (dual terminal) that supports both a cellular communication scheme and a WLAN communication scheme.

The E-UTRAN 10 includes a plurality of evolved Node-Bs (eNBs) 200. The eNB 200 corresponds to a cellular base station. The eNB 200 manages one or more cells, and performs radio communication with the UE 100 that has established a connection with its own cell. A "cell" is used as not only a term indicating a minimum unit of a radio communication area but also a term indicating a function of performing radio communication with the UE 100. For example, the eNB 200 has a radio resource management (RRM) function, a user data routing function, a measurement control function for mobility control/scheduling, and the like.

The eNBs 200 are connected with one another via an X2 interface. The eNB 200 is connected with a mobility management entity (MME)/serving-gateway (S-GW) 500 included in the EPC 20 via an S1 interface.

The EPC 20 includes a plurality of MME/S-GWs 500. The MME is a network node that performs various kinds of mobility control on the UE 100 and corresponds to a control station. The S-GW is a network node that performs transfer control of user data and corresponds to an exchange station.

A WLAN 30 includes a WLAN access point (hereinafter, referred to as an "AP") 300. The AP 300 is, for example, an AP (an operator controlled AP) under control of an operator of an LTE network.

The WLAN 30 is configured to comply with, for example, an IEEE 802.11 standard. The AP 300 performs communication with the UE 100 at a frequency band (a WLAN frequency band) different from a cellular frequency band. The AP 300 is connected to the EPC 20 via a router or the like.

The present disclosure is not limited to an example in which the eNB 200 and the AP 300 are individually arranged, and the eNB 200 and the AP 300 may be arranges (collocated) at the same place. Alternatively, the eNB 200 and the AP 300 may be directly connected through an arbitrary interface of an operator. The interface may be a standardized interface. The interface between the eNB 200 and the AP 300 will be described later in detail.

Next, configurations of the UE 100, the eNB 200, and the AP 300 will be described.

Figure 2:
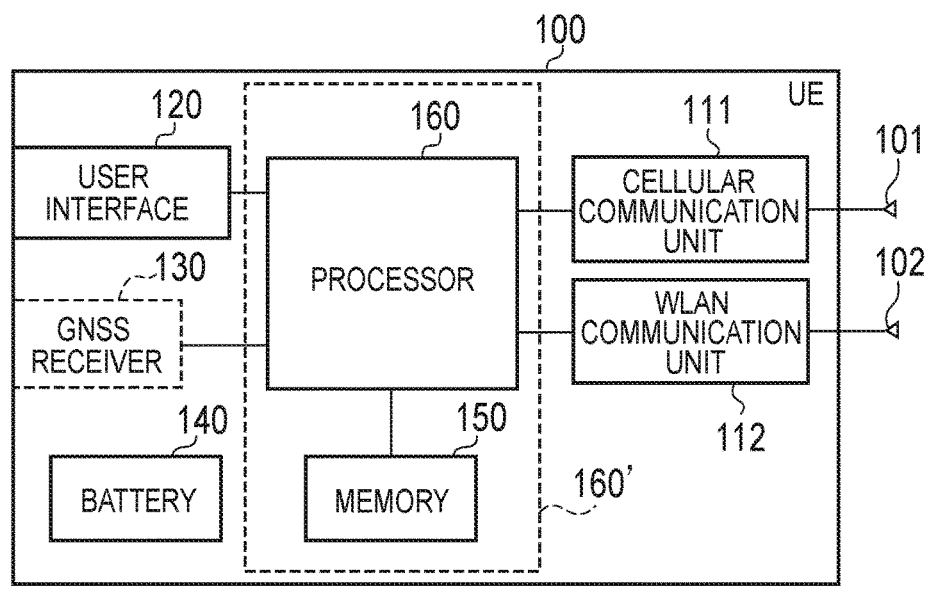
FIG. 2 is a block diagram illustrating a UE according to first and second embodiments.

FIG. 2 is a block diagram illustrating the UE 100. The UE 100 includes antennas 101 and 102, a cellular communication unit 111, a WLAN communication unit 112, a user interface 120, a global navigation satellite system (GNSS) receiver 130, a battery 140, a memory 150, and a processor 160 as illustrated in FIG. 2. The memory 150 and the processor 160 constitute a controller. The UE 100 may not include the GNSS receiver 130. The memory 150 may be integrated with the processor 160, and this set (that is, a chip set) may be used as the processor 160'.

The antenna 101 and the cellular communication unit 111 are used for transmission and reception of cellular radio signals. The cellular communication unit 111 converts a baseband signal output from the processor 160 into a cellular radio signal and transmits the cellular radio signal through the antenna 101. The cellular communication unit 111 converts a cellular radio signal received through the antennas 101 into a baseband signal and outputs the baseband signal to the processor 160.

The antenna 102 and the WLAN communication unit 112 are used for transmission and reception of WLAN radio signals. The WLAN communication unit 112 converts a baseband signal output from the processor 160 into a WLAN radio signal and transmits the WLAN radio signal through the antenna 102. The WLAN communication unit 112 converts a WLAN radio signal received through the antennas 102 into a baseband signal and outputs the baseband signal to the processor 160.

The user interface 120 is an interface with the user who carries the UE 100, and includes, for example, a display, a microphone, a speaker, various kinds of buttons, and the like. The user interface 120 receives an input from the user, and outputs a signal indicating content of the input to the processor 160. In order to obtain position information indicating a geographical position of the UE 100, the GNSS receiver 130 receives a GNSS signal and outputs the received signal to the processor 160. The battery 140 accumulates electric power to be supplied to the respective blocks of the UE 100.

The memory 150 stores a program executed by the processor 160 and information used for a process performed by the processor 160. The processor 160 includes a baseband processor that performs, for example, modulation, demodulation, encoding, and decoding of the baseband signal and a CPU that performs various kinds of processes by executing the program stored in the memory 150. The processor 160 may include a codec that encodes and decodes audio and video signals. The processor 160 executes various kinds of processes which will be described later and various kinds of communication protocols.

Figure 3:
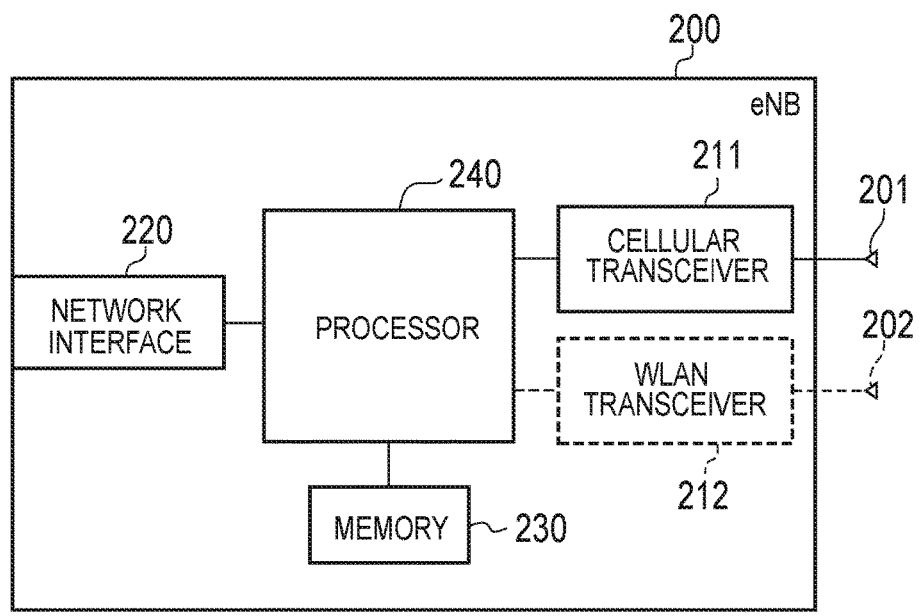
FIG. 3 is a block diagram illustrating an eNB according to the first and second embodiments.

FIG. 3 is a block diagram illustrating the eNB 200. The eNB 200 includes an antenna 201, a cellular transceiver 211, a network interface 220, a memory 230, and a processor 240 as illustrated in FIG. 3. The memory 230 and the processor 240 constitute a controller. The memory 230 may be integrated with the processor 240, and this set (that is, a chip set) may be used as a processor.

The antenna 201 and the cellular transceiver 211 are used for transmission and reception of radio signals. The cellular transceiver 211 converts a baseband signal output from the processor 240 into a cellular radio signal and transmits the cellular radio signal through the antenna 201. The cellular transceiver 211 converts a cellular radio signal received by the antenna 201 into a baseband signal, and outputs the baseband signal to the processor 240.

Figure 7:
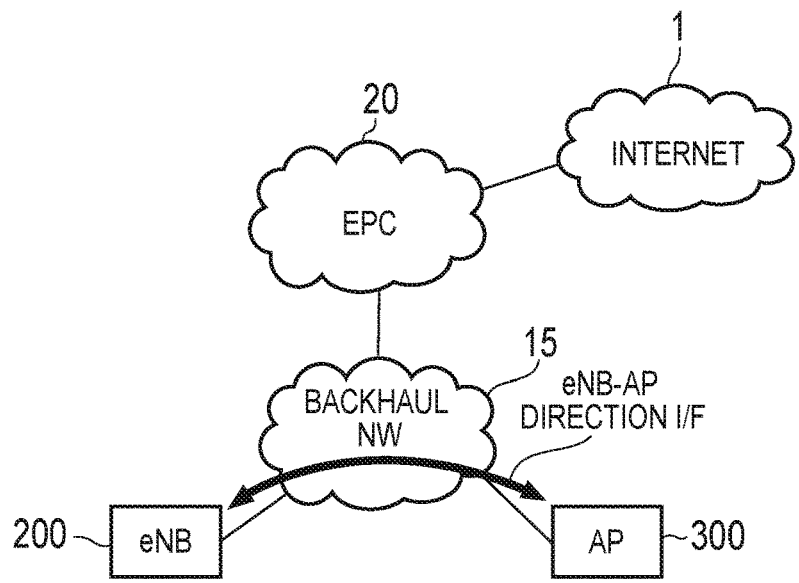
FIG. 7 is a diagram illustrating a network configuration according to the first embodiment.

The network interface 220 is connected with a backhaul network (backhaul NW) 15 illustrated in FIG. 7.

The memory 230 stores a program executed by the processor 240 and information used for a process performed by the processor 240. The processor 240 includes a baseband processor that perform, for example, modulation, demodulation, encoding, and decoding of the baseband signal and a CPU that performs various kinds of processes by executing the program stored in the memory 230. The processor 240 executes various kinds of processes which will be described later and various kinds of communication protocols.

Figure 4:
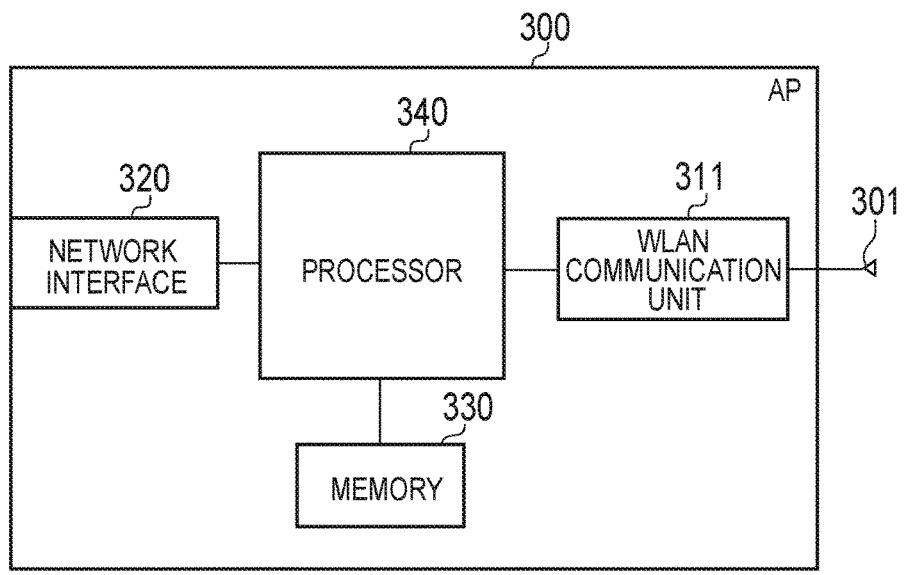
FIG. 4 is a block diagram illustrating an AP according to the first and second embodiments.

FIG. 4 is a block diagram illustrating the AP 300. The AP 300 includes an antenna 301, a WLAN communication unit 311, a network interface 320, a memory 330, and a processor 340 as illustrated in FIG. 4.

The antenna 301 and the WLAN communication unit 311 are used for transmission and reception of WLAN radio signals. The WLAN communication unit 311 converts a baseband signal output from the processor 340 into a WLAN radio signal and transmits the WLAN radio signal through the antenna 301. The WLAN communication unit 311 converts a WLAN radio signal received through the antennas 301 into a baseband signal and outputs the baseband signal to the processor 340.

The network interface 320 is connected with the backhaul network (backhaul NW) 15 illustrated in FIG. 7.

The memory 330 stores a program executed by the processor 340 and information used for a process performed by the processor 340. The processor 340 includes a baseband processor that performs, for example, modulation, demodulation, encoding, and decoding of the baseband signal and a CPU that performs various kinds of processes by executing the program stored in the memory 330. The processor 340 executes various kinds of processes which will be described later.

When the eNB 200 is a cellular-WLAN integrated type, the eNB 200 further includes an antenna 202 and a WLAN transceiver 212. The antenna 202 and the WLAN transceiver 212 are used for transmission and reception of WLAN radio signals. The WLAN transceiver 212 converts a baseband signal output from the processor 240 into a WLAN radio signal and transmits the WLAN radio signal through the antenna 202. The WLAN transceiver 212 converts a WLAN radio signal received through the antennas 202 into a baseband signal and outputs the baseband signal to the processor 240.

Figure 5:
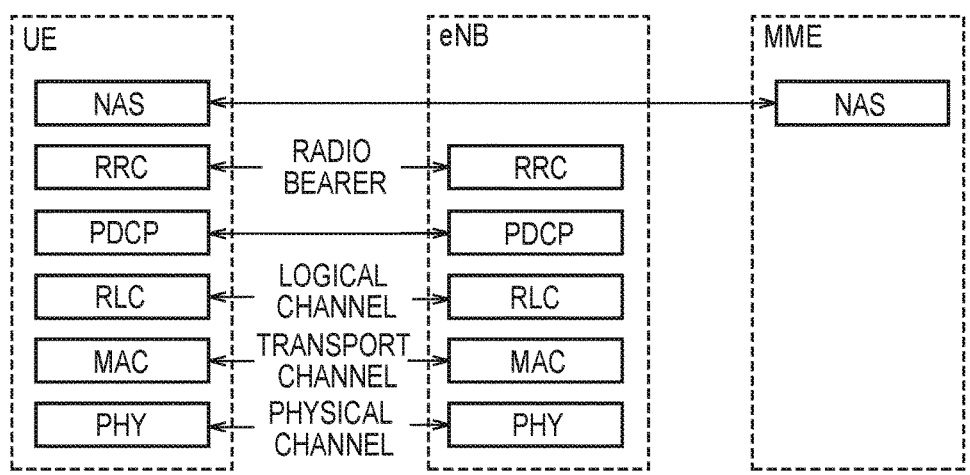
FIG. 5 is a protocol stack diagram illustrating an LTE radio interface according to the first and second embodiments.

FIG. 5 is a protocol stack diagram of an LTE radio interface. A radio interface protocol is classified into first to third layers of an OSI reference model, and the first layer is a physical (PHY) layer as illustrated in FIG. 5. The second layer includes a medium access control (MAC) layer, a radio link control (RLC) layer, and a packet data convergence protocol (PDCP) layer. The third layer includes a radio resource control (RRC) layer.

The PHY layer performs encoding/decoding, modulation/demodulation, antenna mapping/demapping, and resource mapping/demapping. User data and a control signal are transmitted through a physical channel between the PHY layer of the UE 100 and the PHY layer of the eNB 200.

The MAC layer performs preferential control of data, a retransmission process by hybrid ARQ (HARQ), and the like. User data and a control signal are transmitted through a transport channel between the MAC layer of the UE 100 and the MAC layer of the eNB 200. The MAC layer of the eNB 200 includes a scheduler for deciding transport formats (a transport block size and a modulation and coding scheme (MCS)) of an uplink and a downlink and a resource block to be allocated to the UE 100.

The RLC layer transmits data to an RLC layer of a reception side using the functions of the MAC layer and the PHY layer. User data and control information are transmitted through a logical channel between the RLC layer of the UE 100 and the RLC layer of the eNB 200.

The PDCP layer performs header compression/decompression and encryption/decryption.

The RRC layer is defined only in a control plane in which a control signal is dealt with. A control signal (an RRC message) for various kinds of settings is transmitted between the RRC layer of the UE 100 and the RRC layer of the eNB 200. The RRC layer controls the logical channel, the transport channel, and the physical channel in response to establishment, re-establishment, and release of the radio bearer. When there is a connection (an RRC connection) between the RRC of the UE 100 and the RRC of the eNB 200, the UE 100 is in an RRC connected state (a connected state), and otherwise, the UE 100 is in an RRC idle state (an idle state).

A non-access stratum (NAS) layer positioned above the RRC layer performs session management, mobility management, and the like.

Figure 6:
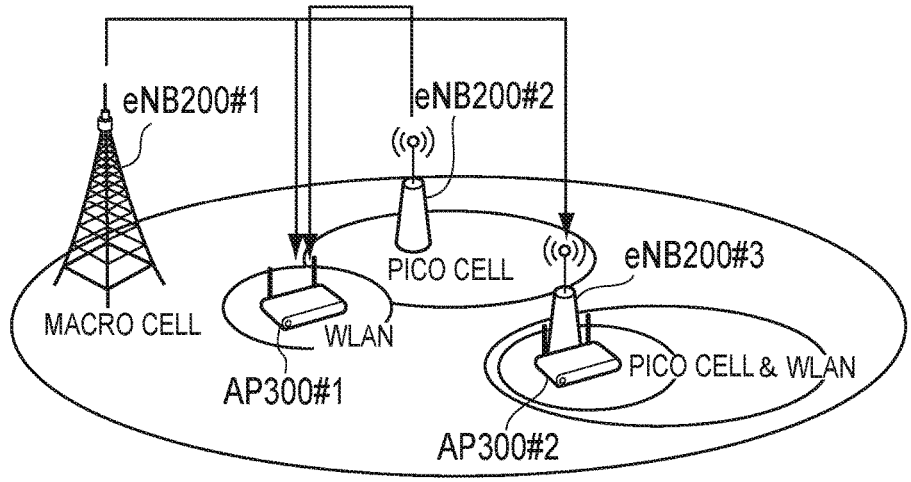
FIG. 6 is a diagram illustrating an application scenario of a communication system according to the first embodiment.

FIG. 6 is a diagram illustrating an application scenario of a communication system according to the first embodiment.

As illustrated in FIG. 6, an eNB 200#1 manages a macro cell. eNBs 200#2 and 200#3 each of which manages a pico cell are installed in the coverage of the macro cell. An AP 300#1 is installed in the coverage of the macro cell. An AP 300#2 is installed in at the same place as the eNB 200#3. The AP 300#3 may be incorporated into the eNB 200#3.

In such an application scenario, when the load of the eNB 200#1 is high, traffic accommodated by the eNB 200#1 is transferred to the eNB 200#2, the eNB 200#3, the AP 300#1, and the AP 300#2, and thus the load of the eNB 200#1 is reduced (off load). On the other hand, when the load of the eNB 200#1 is low, traffic accommodated by the eNB 200#2, the eNB 200#3, the AP 300#1, or the AP 300#2 is returned to the eNB 200#1, and thus the load of the eNB 200#1 is increased (on load).

Since the eNB 200#3 and the AP 300#3 are integrally configured, collaboration control of on load/off load can be performed between the eNB 200#3 and the AP 300#3.

Further, the eNBs 200#1 to 200#3 are nodes of the same system (the same standard), and performs collaboration control of on load/off load using the X2 interface or the like.

However, the AP 300#1 is separately installed and a node of a different system (a different standard) from the eNBs 200#1 to 200#3, and thus it is difficult for the AP 300#1 to perform control of on load/off load in collaboration with the eNBs 200#1 to 200#3. In this regard, the first embodiment, the advanced communication control in which the eNB 200 and the AP 300 collaborate with each other can be performed through the following configuration.

FIG. 7 is a diagram illustrating a network configuration according to the first embodiment.

As illustrated in FIG. 7, the eNB 200 and the AP 300 are connected to the backhaul NW 15. The backhaul NW 15 is a network (the IP network) managed by the operator of the LTE network. The backhaul NW 15 is connected with the EPC 20 serving as the core network, and the EPC 20 is connected with the Internet 1.

A direct communication path is established between the eNB 200 and the AP 300 with no intervention of the EPC 20. The direct communication path is established on the backhaul NW 15 and constitutes a direct virtual communication path (that is, a connection). Hereinafter, the direct communication path is referred to as an "eNB-AP direct I/F." The eNB 200 performs communication with the AP 300 using the eNB-AP direct I/F. As a result, the advanced communication control in which the eNB 200 and the AP 300 collaborate with each other can be implemented even for the AP 300 that is separately installed such as the AP 300#1 illustrated in FIG. 6.

Figure 8:
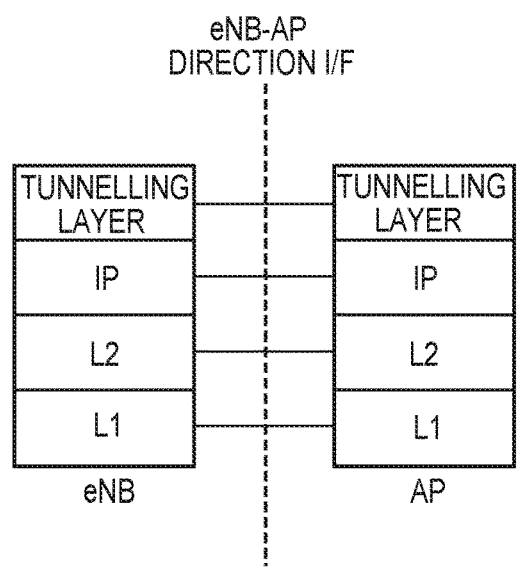
FIG. 8 is a protocol stack diagram of an eNB-AP direct I/F according to the first embodiment.

FIG. 8 is a protocol stack diagram illustrating the eNB-AP direct I/F.

As illustrated in FIG. 8, each of the eNB 200 and the AP 300 has a physical layer (L1), a data link layer (L2), an IP layer (L3), and a tunneling layer. The backhaul NW 15 is an IP network and thus performs encapsulation/decapsulation of packets (IP packets) in the IP layer in the tunneling layer and sets an IP tunnel between the eNB 200 and the AP 300. Such an IP tunnel constitutes an eNB-AP direct I/F. An upper layer such as an application layer (for example, X2-AP) may be disposed on a fifth or higher layer.

Next, a use case of the eNB-AP direct I/F according to the first embodiment will be described. In the first embodiment, the eNB 200 acquires load information of the AP 300 using the eNB-AP direct I/F. The load information of the AP 300 includes, for example, a radio resource usage rate of the AP 300 and a hardware load level of the AP 300.

The eNB 200 performs at least one of control (off load control) for transferring the traffic of the UE 100 from the eNB 200 to the AP 300 and control (on load control) for returning the traffic of the UE 100 from the AP 300 to the eNB 200 based on the load information of the AP 300. As will be described later, the eNB 200 may perform at least one of the off load control and the on load control based on information (for example, RCPI, RSNI, Beacon RSSI, or the like) indicating a radio quality of the AP 300 in addition to the load information of the AP 300.

For example, the eNB 200 notifies the UE 100 of a parameter (auxiliary RAN parameter) associated with the load of the AP 300 in the broadcast or unicast manner. The UE 100 transfers the traffic of the UE 100 from the eNB 200 to the AP 300 (off load) or returns the traffic from the AP 300 to the eNB 200 (on load) based on the auxiliary RAN parameter. When the load of the AP 300 is high, the eNB 200 sets the auxiliary RAN parameter to reduce a possibility that the UE 100 will perform the off load.

Alternatively, when the eNB 200 notifies the UE 100 of an identifier (an SSID or the like) of the AP 300 of an off load candidate, the identifier of the AP 300 having the high load may be excluded, and then the off load control may be performed.

Alternatively, the details thereof will be described in a third embodiment, and the eNB 200 and the AP 300 may simultaneously perform communication with the same UE 100. In this case, each of the eNB 200 and the AP 300 may exchange information of a bearer established between its own station and the UE 100 using the eNB-AP direct I/F.

Further, when such a bearer setting path is changed, the eNB 200 and the AP 300 may perform control of changing the bearer setting path using the eNB-AP direct I/F. For example, the AP 300 may change the bearer established between its own station and the core network to the bearer with intervention of the eNB 200.

As described above, according to the first embodiment, the advanced communication control in which the eNB 200 and the AP 300 collaborate with each other can be implemented.

First Modified Example of First Embodiment

Next, a first modified example of the first embodiment will be described focusing on a different point from the first embodiment. In the first modified example, the eNB 200 can also acquire information other than the load information of the AP 300 using the eNB-AP direct I/F.

For example, the eNB 200 may acquire a carrier sensing result indicating an interference situation in a frequency band available to the AP 300 from the AP 300 using the eNB-AP direct I/F. The AP 300 may measure the interference situation in the frequency band available to the AP 300 based on an instruction given from the eNB 200 or may measure the interference situation periodically.

The eNB 200 can perform at least one of the off load control and the on load control based on the carrier sensing result of the AP 300. For example, when interference energy that is indicated by the carrier sensing result and received by the AP 300 is a threshold value or higher, the eNB 200 sets the auxiliary RAN parameter to reduce the possibility that the UE 100 will perform the off load. When the interference energy received by the AP 300 is less than the threshold value, the eNB 200 sets the auxiliary RAN parameter to increase the possibility that the UE 100 will perform the off load.

Further, the eNB 200 may acquire information indicating the number of UEs connected to the AP 300 from the AP 300 using the eNB-AP direct I/F. For example, when the number of UEs connected to the AP 300 is a threshold value or more, the eNB 200 sets the auxiliary RAN parameter to reduce the possibility that the UE 100 will perform the off load. When the number of UEs connected to the AP 300 is less than the threshold value, the eNB 200 sets the auxiliary RAN parameter to increase the possibility that the UE 100 will perform the off load.

Further, the eNB 200 may acquire information indicating the throughput of the AP 300 from the AP 300 using the eNB-AP direct I/F. For example, when the throughput of the AP 300 is a threshold value or higher, the eNB 200 sets the auxiliary RAN parameter to increase the possibility that the UE 100 will perform the off load. When the throughput of the AP 300 is less than the threshold value, the eNB 200 sets the auxiliary RAN parameter to reduce the possibility that the UE 100 will perform the off load.

The eNB 200 may acquire a measurement report related to the radio signal of the AP 300 from the UE 100. The UE 100 reports measurement results of information (a received channel power indicator (RCPI)) indicating reception strength of a radio signal received from the AP 300, information (a received signal to noise indicator (RSNI)) indicating a reception quality of the radio signal received from the AP 300, and information (a beacon RSSI) indicating reception power of a beacon transmitted from the AP 200 to the eNB 200. The UE 100 may report information related to the radio signal received from the eNB 200 (3GPP RAN) (a measurement report). The UE 100 may give the measurement report based on an instruction given from the eNB 200. The eNB 200 may perform at least one of the off load control and the on load control based on the measurement report received from the UE 100 and the information acquired from the AP 100. The eNB 200 gives a notification of the set auxiliary RAN parameter to the UE 100 serving as the transmission source of the measurement report based on the measurement report received from the UE 100 and the information acquired from the AP 100 in the unicast manner.

Second Modified Example of First Embodiment

Next, a second modified example of the first embodiment will be described focusing on a difference with the first modified example of the first embodiment. In the second modified example, the eNB 200 selects the AP 300 serving as a candidate of the off load control or the on load control (hereinafter, "off/on load control") among a plurality of APs 300.

(1) First AP Selection Method

The eNB-AP direct I/F is assumed to be set between the eNB 200 and each of a plurality of APs 300 (an AP 300-1 or an AP 300-2).

The eNB 200 acquires information (for example, the load information) of the AP 300 from the AP 300-1 and the AP 300-2 using the eNB-AP direct I/F. The eNB 200 compares, for example, the load information of the AP 300-1 with the load information of the AP 300-2, and selects the AP 300 having the low load as the AP 300 serving as the off/on load control candidate. Alternatively, when the load of the AP 300-1 is lower than a threshold value, the eNB 200 selects the AP 300-1 as the AP 300 serving as the off/on load control candidate. The same applies in the AP 300-2.

The eNB 200 excludes an AP 300 that is not the off/on load control candidate from a WLANID list including an identifier of an AP serving as the off/on load control candidate. The eNB 200 notifies the UE 100 of its own cell of the WLANID list. The UE 100 starts the off load or the on load on the AP 300 indicated by the WLANID list based on the auxiliary RAN parameter.

As described above, the eNB 200 may perform at least one of the off/on load control.

The eNB 200 may receive (acquire) the measurement report from the UE 100 of its own cell and select the AP 300 serving as the off/on load control candidate based on the measurement report. For example, when the reception strength received from the AP 300-1 is determined to be highest based on the measurement report received from the UE 100, the eNB 200 sets (adjusts) the auxiliary RAN parameter so that the AP 300-1 becomes the target of the off/on load control for the UE 100. The eNB 200 may acquire information of the AP 300 from each of a plurality of APs 300 in setting the auxiliary RAN parameter. The eNB 200 can set (adjust) the auxiliary RAN parameter based on the information of the AP 300 so that other APs 300 do not become the target of the off/on load control for the UE 100. Thereafter, the eNB 200 notifies the UE 100 serving as the transmission source of the measurement report of the set auxiliary RAN parameter.

(2) Second AP Selection Method

The eNB 200 selects the AP 300 serving as the off/on load control candidate among a plurality of APs 300 based on both the measurement report received from the UE 100 (the measurement report related to the radio signal of the AP 300 or the measurement report related to the radio signal of the eNB 200) and the information acquired from the AP 100. The eNB 200 includes the identifier (for example, an SSID, a BSSID, an HESSID, or the like) of the selected AP 300 in an RRC connection reconfiguration message for performing the off/on load, and transmits the resulting message to the UE 100.

The eNB 200 may select the AP 300 serving as a WLAN communication target in a cellular-WLAN aggregation (which will be described later) among a plurality of APs 300. The eNB 200 includes the identifier of the selected AP 300 in the RRC connection reconfiguration message for executing the cellular-WLAN aggregation, and transmits the resulting message to the UE 100. The UE 100 starts control that is performed such that the off/on load (or the cellular-WLAN aggregation) is performed on the AP 300 included in the message.

Second Embodiment

Next, a second embodiment will be described focusing on a difference with the first embodiment.

Figure 9:
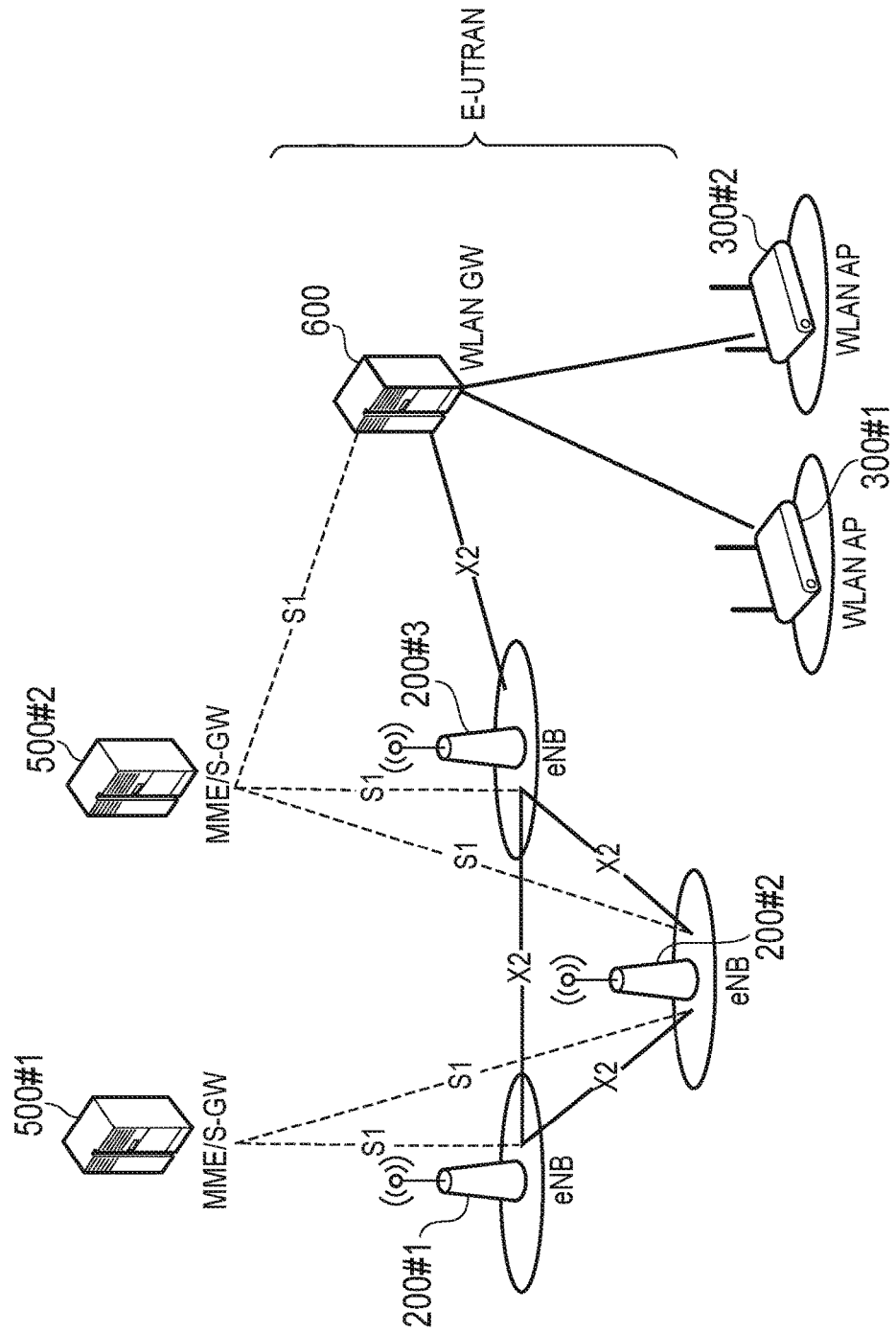
FIG. 9 is a diagram illustrating a network configuration according to a second embodiment.

FIG. 9 is a diagram illustrating a network configuration according to the second embodiment.

As illustrated in FIG. 9, a communication system according to the second embodiment includes a WLAN GW (a gateway apparatus) 600 that accommodates the AP 300. The WLAN GW 600 is installed in the backhaul NW 15 (see FIG. 7). The WLAN GW 600 includes a processor, a memory, a network interface, and the like as a hardware configuration.

A direct communication path is established between the eNB 200 and the WLAN GW 600 with no intervention of the EPC 20. The eNB 200 performs communication control via the WLAN GW 600 in collaboration with the AP 300. In the second embodiment, a protocol of an intern-eNB interface (X2 interface) is applied to the direct communication path. The WLAN GW 600 includes a protocol stack of the X2 interface and a WLAN protocol stack. An X2 application (AP) ID is allocated to the WLAN GW 600 to be able to support an X2AP protocol. The WLAN GW 600 may have an S1 U connection function with an MME/S-GW 500.

The WLAN GW 600 terminates an X2-AP protocol and terminates a WLAN protocol. Thus, the WLAN GW 600 is regarded as a neighboring eNB 200 from a standpoint of the eNB 200. The WLAN GW 600 is regarded as the AP 300 from a standpoint of the core network. Further, the WLAN GW 600 is regarded as the core network from a standpoint of the AP 300.

The WLAN GW 600 performs protocol exchange between the X2 interface protocol and the WLAN protocol. For example, the WLAN GW 600 converts a command of the X2AP protocol transmitted from the eNB 200 into a command of the WLAN protocol, and transmits the converted command to the AP 300. The WLAN GW 600 converts a command of the WLAN protocol transmitted from the AP 300 into a command of the X2AP protocol, and transmits the converted command to the eNB 200.

As a result, the eNB 200 can perform communication with the AP 300 according to the existing protocol. Thus, the advanced communication control in which the eNB 200 and the AP 300 collaborate with each other can be implemented.

In the second embodiment, the WLAN GW 600 accommodates a plurality of APs 300 (the AP 300#1, the AP 300#2, ... ). The WLAN GW 600 collectively manages a plurality of APs 300. The WLAN GW 600 collectively transmits (broadcasts) a command received from the eNB 200 to a plurality of APs 300. The WLAN GW 600 may aggregate (collects) a command or information transmitted from a plurality of APs 300 and transmit the result to the eNB 200. As a result, the load of the eNB 200 and the traffic of the backhaul NW 15 can be reduced to be smaller than when the eNB 200 performs communication with a plurality of APs 300 individually.

Next, a use case of the WLAN GW 600 according to the second embodiment will be described. In the second embodiment, the eNB 200 acquires the load information of the AP 300 through the WLAN GW 600. For example, the eNB 200 transmits a load information request message (a resource status request) specified in the X2AP protocol to the AP 300 through the WLAN GW 600. The AP 300 receives the load information request message whose protocol has been converted through the WLAN GW 600. The AP 300 transmits its own load information to the eNB 200 through the WLAN GW 600. The eNB 200 receives a load information notification message (a resource status update) whose protocol has been changed through the WLAN GW 600.

The eNB 200 performs at least one of control (the off load control) for transferring the traffic of the UE 100 from the eNB 200 to the AP 300 and control (the on load control) for returning the traffic of the UE 100 from the AP 300 to the eNB 200 based on the load information of the AP 300. A specific example of such control is the same as in the first embodiment.

As described above, according to the second embodiment, the advanced communication control in which the eNB 200 and the AP 300 collaborate with each other can be implemented.

Third Embodiment

Next, a third embodiment will be described focusing on a difference with the first and second embodiments. In the third embodiment, the throughput of the UE 100 is actively improved using the network configuration according to the first and second embodiments.

Figure 10:
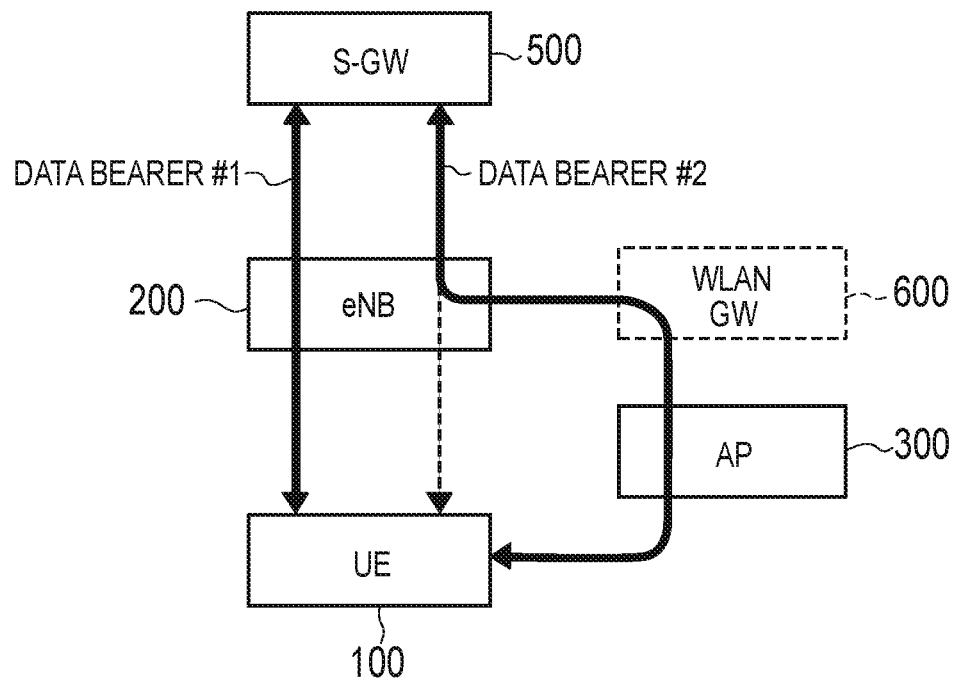
FIG. 10 is a diagram illustrating a communication control method according to a third embodiment.

FIG. 10 is a diagram illustrating a communication control method according to the third embodiment. The third embodiment is based on the premise of the network configuration of the first embodiment or the network configuration of the second embodiment.

In the third embodiment, the UE 100 has a radio connection with the eNB 200 and a radio connection with the AP 300 as illustrated in FIG. 10. In other words, the UE 100 simultaneously establishes a connection with the eNB 200 and the AP 300. In other words, the radio resources are allocated from each of the eNB 200 and the AP 300 to the UE 100.

The eNB 200 maintains the RRC connection with the UE 100 having the radio connection with the eNB 200 and the radio connection with the AP 300. Thus, the eNB 200 can perform various kinds of communication control on the UE 100.

In the third embodiment, the eNB 200 directly performs transmission and reception of data with the UE 100 and indirectly performs transmission and reception of data with the UE 100 through the AP 300 (and the WLAN GW 600). Specifically, a data bearer #1 (a first data bearer) with intervention of the eNB 200 other than the AP 300 and a data bearer #2 (a second data bearer) with intervention of the AP 300 and the eNB 200 are established between the UE 100 and the S-GW 500 (the EPC 20). The data bearers #1 and #2 are managed in the RRC layer of the eNB 200.

As described above, the UE 100 establishes a plurality of data bearers through the eNB 200 and the AP 300. The radio resources are allocated from each of the eNB 200 and the AP 300 to the UE 100. Thus, a plurality of pieces of data (a plurality of pieces of user data) can be transmitted in parallel in a state in which a large communication capacity is secured, the throughput can be significantly improved.

In the third embodiment, data is transmitted and received in an IP packet state in the data bearer #2 between the eNB 200 and the AP 300. Alternatively, data is transmitted and received in a PDCP packet state encapsulated in an IP packet in the data bearer #2 between the eNB 200 and the AP 300. The data bearer #2 may be split into two in the eNB 200. One of the split data bearers terminates at the UE 100 through the AP 300, and the other of the split data bearers terminates at the UE 100 with no intervention of the AP 300.

Next, a data transmission scheme according to the third embodiment will be described.

Figure 11:
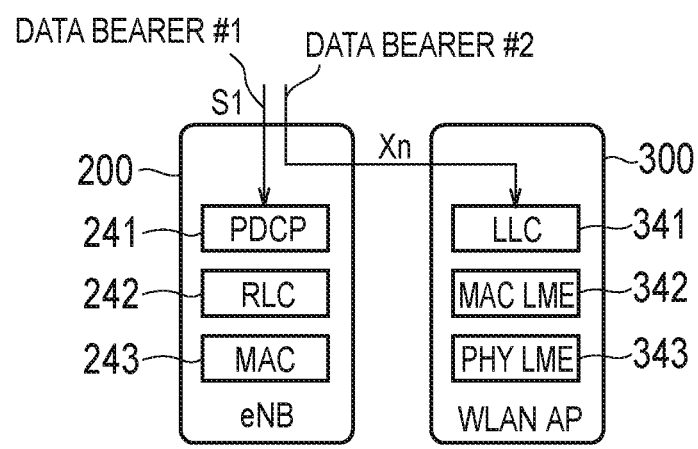
FIG. 11 is a diagram illustrating a first data transmission scheme according to the third embodiment.
Figure 12:
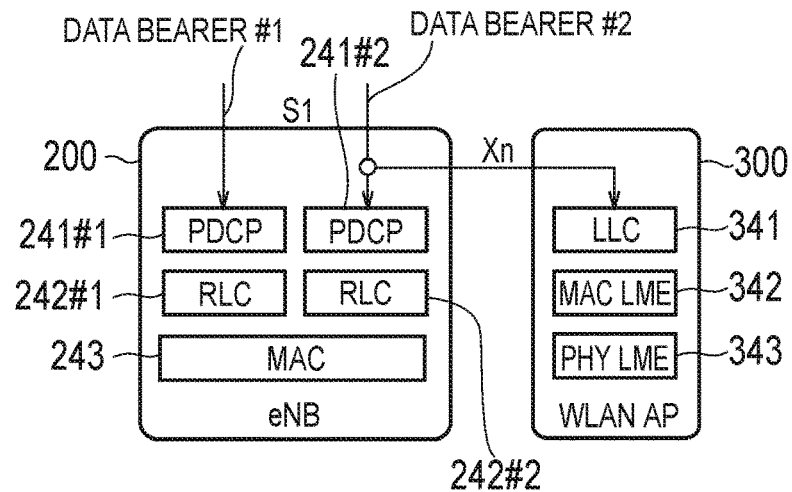
FIG. 12 is a diagram illustrating a second data transmission scheme according to the third embodiment.
Figure 13:
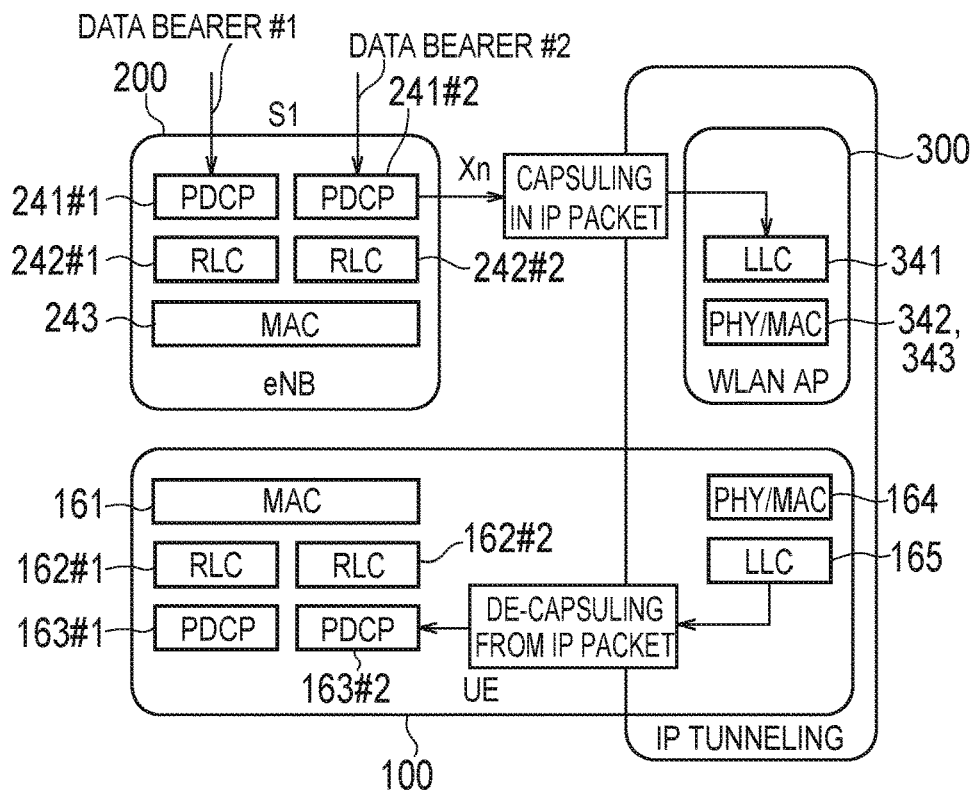
FIG. 13 is a diagram illustrating a third data transmission scheme according to the third embodiment.

FIG. 11 is a diagram illustrating a first data transmission scheme according to the third embodiment. In FIGS. 11 to 13, the RRC layer and the physical layer are not illustrated.

The eNB 200 includes a PDCP function 241, an RLC function 242, and a MAC function 243 as illustrated in FIG. 11. The AP 300 includes an LLC function 341, a MAC LME function 342, and a PHY LME function 343.

The eNB 200 transfers data belonging to the data bearer #2 to the AP 300 in a higher layer than the PDCP function 241. In other words, data is transmitted and received in the IP packet state in the data bearer #2 between the eNB 200 and the AP 300. Since a general AP 300 deals with the IP packet supplied from a network side, the existing AP 300 can be used since the IP packet is transferred from the eNB 200 to the AP 300.

The data (the IP packet) belonging to the data bearer #2 is transmitted to the UE 100 through the LLC function 341, the MAC LME function 342, and the PHY LME function 343 in the AP 300.

On the other hand, data belonging to the data bearer #1 is transmitted to the UE 100 through the PDCP function 241, the RLC function 242, and the MAC function 243.

FIG. 12 is a diagram illustrating a second data transmission scheme according to the third embodiment. In the second data transmission scheme, similarly to the first data transmission scheme, data is transmitted and received in the IP packet state in the data bearer #2 between the eNB 200 and the AP 300.

As illustrated in FIG. 12, the eNB 200 includes a PDCP function 241#1 for the data bearer #1, a PDCP function 241#2 for the data bearer #2, an RLC function 242#1 for the data bearer #1, an RLC function 242#2 for the data bearer #2, and a MAC function 243. The AP 300 has the same configuration as in the first data transmission scheme.

The eNB 200 distributes the data belonging to the data bearer #2 to the PDCP function 241#2 and the AP 300 in a higher layer than the PDCP function 241. The data distributed to the PDCP function 241#2 is transmitted to the UE 100 through the PDCP function 241#2, the RLC function 242#2, and the MAC function 243.

The data (the IP packet) distributed to the AP 300 is transmitted to the UE 100 through the LLC function 341, the MAC LME function 342, and the PHY LME function 343.

On the other hand, the data belonging to the data bearer #1 is transmitted to the UE 100 through the PDCP function 241#1, the RLC function 242#1, and the MAC function 243.

FIG. 13 is a diagram illustrating a third data transmission scheme according to the third embodiment. In the third data transmission scheme, data is transmitted and received in the PDCP packet state encapsulated in the IP packet in the data bearer #2 between the eNB 200 and the AP 300.

As illustrated in FIG. 13, the eNB 200 includes a PDCP function 241#1 for the data bearer #1, a PDCP function 241#2 for the data bearer #2, an RLC function 242#1 for the data bearer #1, an RLC function 242#2 for the data bearer #2, and a MAC function 243. The AP 300 has the same configuration as in the first data transmission scheme.

The UE 100 includes a MAC function 161, an RLC function 162#1 for the data bearer #1, a PDCP function 163#1 for the data bearer #1, an RLC function 162#2 for the data bearer #2, a PDCP function 163#2 for the data bearer #2, a PHY/MAC function 164 of the WLAN, and an LLC function 165.

The eNB 200 distributes the data (the PDCP packet) belonging to the data bearer #2 to the RLC function 242#2 and the AP 300 in the PDCP function 241. The data distributed to the RLC function 242#2 is transmitted to the UE 100 through the RLC function 242#2 and the MAC function 243. The UE 100 processes the data belonging to the data bearer #2 through the MAC function 161, the RLC function 162#2, and the PDCP function 163#2 in the described order.

The data (the PDCP packet) distributed to the AP 300 is encapsulated in the IP packet in the eNB 200 (or the WLAN GW 600) and transferred to the AP 300. An AG entity 351 which will be described later may encapsulate data in the IP packet. Alternatively, data may be transferred to the AP 300 in a format in the tunneling layer of the eNB 200, or data (for example, a PDCP PDU) may be transferred to the AP 300.

The AP 300 transmits the IP packet to the UE 100 through the LLC function 341, the MAC LME function 342, and the PHY LME function 343. The UE 100 processes the data belonging to the data bearer #2 through the PHY/MAC function 164 and the LLC function 165, decapsulates the IP packet, and acquires the PDCP packet. The PDCP packet undergoes sequencing (reordering) with the PDCP packet from the RLC function 162#2 in the PDCP function 163#2. As described above, the PDCP packet is encapsulated/decapsulated, and thus IP tunneling is established in a WLAN interval. Here, since the PDCP performs a security process such as encryption and authentication, security of an LTE level is implemented in communication at the WLAN side by transferring the PDCP packet to the WLAN side. At the WLAN side, the security process such as encryption and authentication may be omitted.

On the other hand, the data belonging to the data bearer #1 is transmitted to the UE 100 through the PDCP function 241#1, the RLC function 242#1, and the MAC function 243. The UE 100 process the data belonging to the data bearer #1 through the MAC function 161, the RLC function 162#1, and the PDCP function 163#1 in the described order.

First Modified Example of Third Embodiment

Figure 14:
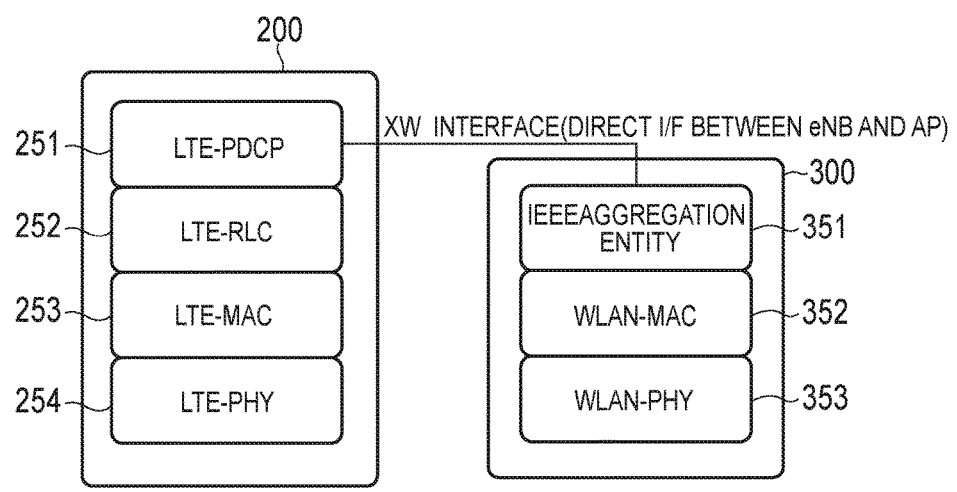
FIG. 14 is a diagram for describing an AG entity.

Next, a first modified example of the third embodiment will be described focusing on a difference with the first to third embodiments. In the first modified example of the third embodiment, the AP 300 includes an aggregation entity (hereinafter, an "AG entity") (see FIG. 14). The controller of the AP 300 performs a function of the AG entity. FIG. 14 is a diagram for describing the AG entity.

(AG Entity)

The eNB 200 includes a PDCP entity (LTE-PDCP) 251, an RLC entity (LTE-RLC) 252, a MAC entity (LTE-MAC) 253, and a PHY entity (LTE-PHY) 254 as illustrated in FIG. 14. On the other hand, the AP 300 includes an AG entity (ieeeAgregation entity) 351, a MAC entity (WLAN-MAC) 352, and a PHY entity (WLAN-PHY) 353.

The AG entity 351 is positioned to be higher than the MAC entity 352. The eNB-AP direct I/F is established between the AG entity 351 and the eNB 200 (the PDCP entity 251).

The AG entity 351 controls the cellular-WLAN aggregation in which data of the UE 100 connected to the AP 300 is transmitted and received using both the cellular communication and the WLAN communication. When the cellular-WLAN aggregation is performed, in the cellular-WLAN aggregation, a data bearer (hereinafter, an AG data bearer) that is a data bearer with intervention of the eNB 200 and the AP 300 and divided in the eNB 200 is established (see the data bearer #2). In FIG. 14, the AG data bearer is divided in the PDCP entity 251 of the eNB 200.

In the downlink, the AG entity 351 receives a data packet (user data) of the UE 100 belonging to the AG data bearer from the eNB 200 (the PDCP entity 251) using the eNB-AP direct I/F. The AG entity 351 performs a predetermined process on the received data packet, and transfers the data packet to the MAC entity 352. For example, the AG entity 351 converts a packet having a cellular communication protocol format into a packet having a WLAN communication protocol format. In the uplink, the AG entity 351 performs an inverse process.

The AG entity 351 supports an arbitrary protocol of an IEEE802 series. For example, the AG entity 351 supports "IEEE802.11ad," "IEEE802.11ac," "IEEE802.11n," "IEEE802.11g," and the like.

The PDCP entity 251 includes the PDCP function 2412. The RLC entity 252 includes the RLC function 2422. The MAC entity 253 includes the MAC function 2432. The PHY entity 254 includes the PHY function. The MAC entity 352 includes the MAC LME function 342. The PHY entity 353 includes the PHY LME function 343.

In FIG. 14, the LLC entity included in the AP 300 is not illustrated. The LLC entity included in the LLC function 341 may be positioned between the AG entity 351 and the MAC entity 352 or may be positioned to be higher than the AG entity 351. Alternatively, the LLC entity may be positioned as the same layer as the AG entity 351. Hereinafter, the data belonging to the data bearer #2 is processed in the LLC function 341 in the AP 300.

(First Operation of AG Entity)

Figure 15:
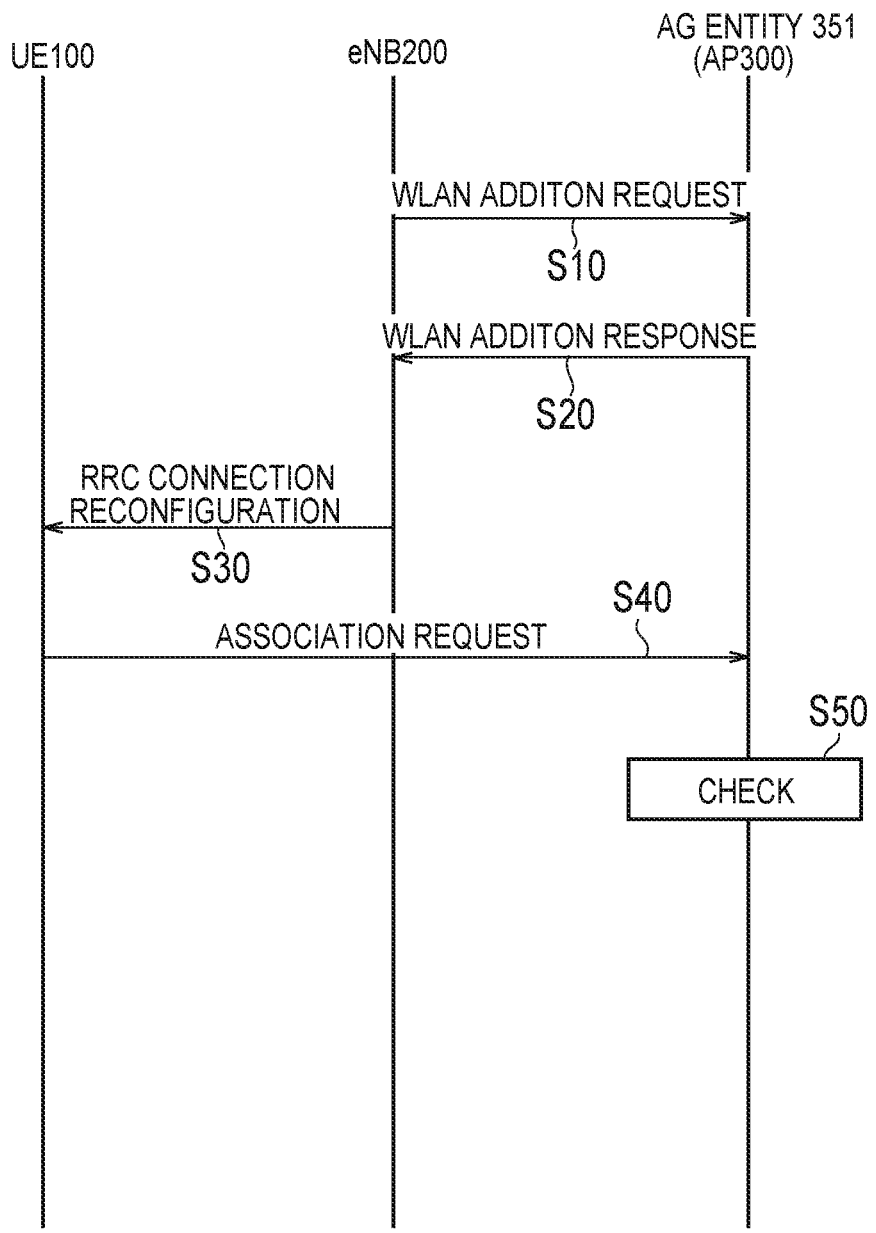
FIG. 15 is a sequence diagram for describing a first operation of an AG entity.

Next, a first operation of the AG entity 351 will be described with reference to FIG. 15. FIG. 15 is a sequence diagram for describing the first operation of the AG entity 351. The first operation of the AG entity 351 is an operation before the cellular-WLAN aggregation starts.

As illustrated in FIG. 15, in step S10, the eNB 200 transmits a WLAN communication execution request (a WLAN addition request) in the cellular-WLAN aggregation to the AG entity 351 (the AP 300) using the eNB-AP direct I/F.

The eNB 200 may include a predetermined identifier (collation information) allocated to the UE 100 serving as the cellular-WLAN aggregation target in the execution request. For example, the predetermined identifier may be an identifier reserved for the UE 100 serving as the cellular-WLAN aggregation target or may be a C-RNTI allocated to the UE 100 serving as the cellular-WLAN aggregation target. When the predetermined identifier is included in the execution request, the AG entity 351 stores the predetermined identifier as the collation information for collating whether or not the UE 100 that has transmitted the connection request is the cellular-WLAN aggregation target.

The execution request may include an identifier (a bearer identifier: a bearer ID) corresponding to the data bearer used in the cellular-WLAN aggregation. The collation information may be a list in which a plurality of bearer identifiers used for the cellular-WLAN aggregation are listed up.

The execution information may include an identifier (TEID) of the tunneling layer. The TEID is an identifier that is used for generating a logical communication path through which user plane data (PDCP PDU) is transferred and indicates the communication path.

The execution request may include the latest measurement report and/or the latest carrier sensing result related to the radio signal of the AP 300 received from the UE 100 by the eNB 200.

The execution request may include a maximum value (a limit value) of the throughput of the UE 100.

In step S20, the AG entity 351 transmits a response (a WLAN addition response) to the execution request to the eNB 200. The response to the execution request may include a (list of) bearer identifier that is denied (not approved) among a plurality of bearer identifiers included in the execution request. For example, when the execution request does not include the above-described information (the bearer identifier, the TEID, the measurement report, the carrier sensing result, the maximum value of the throughput of the UE 100, and the like), the response to the execution request may include the above-described information (the bearer identifier, the TEID, the carrier sensing result measured by the AP 300, the maximum value of the throughput of the UE 100, and the like).

When the WLAN communication in the cellular-WLAN aggregation is executable, the AG entity 351 transmits a positive response to the eNB 200. On the other hand, when the WLAN communication in the cellular-WLAN aggregation is not executable, the AG entity 351 transmits a negative response to the eNB 200. The negative response may include a reason (cause) why the WLAN communication in the cellular-WLAN aggregation is determined not to be executable. For example, the AG entity 351 determines whether or not the WLAN communication is executable according to the load of the AP 300.

When the predetermined identifier is not included in the execution request, the AG entity 351 can allocates a predetermined identifier to the UE 100 serving as the cellular-WLAN aggregation target and include the predetermined identifier in the positive response. The AG entity 351 stores a predetermined identifier included in the positive response as the collation information.

Further, when a plurality of WLAN frequency bands (for example, 2, 4 GHz and 5 GHz) available for the WLAN communication are managed, the AG entity 351 may information indicating a WLAN frequency band to be used by the UE 100 among a plurality of WLAN frequency bands in the positive response. The AG entity 351 may decide the WLAN frequency band to be used by the UE 100 based on the carrier sensing result of performing carrier sensing indicating an interference situation at a plurality of WLAN frequency bands available for the WLAN communication through the AP 300. In this case, the WLAN frequency band to be used by the UE 100 is a frequency band in which the interference energy is less than a threshold value.

The AG entity 351 may generate predetermined information (a part of RRC connection reconfiguration) related to a setting of the cellular-WLAN aggregation in the UE 100. Examples of the predetermined information include a predetermined identifier allocated by the AG entity 351, the WLAN frequency band to be used by the UE 100, and the identifier of the AP 300 to be connected to the UE 100. The AG entity 351 includes the predetermined information in the positive response and transmits the resulting positive response to the eNB 200.

The eNB 200 receives the positive response using the eNB-AP direct I/F, and acquires the predetermined information for setting the cellular-WLAN aggregation (the predetermined identifier allocated by the AG entity 351, the WLAN frequency band to be used by the UE 100, the identifier of the AP 300 to be connected to the UE 100, and the like) from the AG entity 351. As a result, the eNB 200 need not manage the information of the AP 300 for the cellular-WLAN aggregation, and thus the load of the eNB 200 can be reduced. When the eNB 200 is connected with a plurality of APs 300, it is unnecessary to collectively manage the information of a plurality of APs 300, and thus it is particularly effective.

The eNB 200 performs the following process when the response to the execution request is the positive response.

In step S30, the eNB 200 transmits the setting message (the RRC connection reconfiguration) related to the setting of the cellular-WLAN aggregation to the UE 100.

The eNB 200 includes the predetermined information included in the positive response transmitted from the AG entity 351 in the setting message. Alternatively, when the predetermined information (a part of the RRC connection reconfiguration) is received from the AG entity 351, the eNB 200 may integrate the predetermined information into the setting message (the RRC connection reconfiguration) generated by its own station and transmit the integrated setting message to the UE 100. As a result, the AG entity 351 generates a part of the RRC connection reconfiguration, and thus the processing load of the eNB 200 is reduced.

The UE 100 sets the cellular-WLAN aggregation based on the setting message.

In step S40, the UE 100 transmits a connection request (the association request) to the AP 300 to the AP 300. When the connection request to the AP 300 is triggered by the setting of the cellular-WLAN aggregation, the UE 100 transmits the connection request. When the information indicating the WLAN frequency band is included in the setting message, the UE 100 searches for the AP 300 at the WLAN frequency band, and transmits the connection request to the discovered AP 300. When the identifier indicating the AP 300 is included in the setting message, the UE 100 transmits the connection request to the AP 300 indicated by the identifier.

When a predetermined identifier is included in the setting message, the UE 100 transmits the connection request including the predetermined identifier to the AP 300 as the collation information. When no predetermined identifier is included in the setting message, the UE 100 may include the C-RNTI allocated from the eNB 200 in the connection request as the collation information.

In step S50, the AG entity 351 determines whether or not the stored collation information is identical to the stored collation information received from the UE 100. The stored collation information is the collation information received from the eNB 200 or the collation information transmitted from the AG entity 351 to the eNB 200. When the stored collation information is identical to the stored collation information received from the UE 100, the AG entity 351 determines that the UE 100 of the transmission source of the connection request is the cellular-WLAN aggregation target. On the other hand, when the stored collation information is not identical to the stored collation information received from the UE 100, or when no collation information is included in the connection request, the AG entity 351 determines that the UE 100 of the transmission source of the connection request is not the cellular-WLAN aggregation target.

When the UE 100 of the transmission source of the connection request is determined to be the cellular-WLAN aggregation target, the AG entity 351 starts control of the cellular-WLAN aggregation. Further, even when a connection request received from a normal UE 100 is denied, the AG entity 351 may approve the connection request of the UE 100 serving as the cellular-WLAN aggregation target. For example, it is because that a communication data amount between the UE 100 that performs the cellular-WLAN aggregation and the AP 300 is considered to be smaller than a communication data amount between a normal UE 100 that does not perform the cellular-WLAN aggregation and the AP 300.

As described above, when the UE 100 of the transmission source of the connection request is determined to be the cellular-WLAN aggregation target, the AG entity 351 can start control of the cellular-WLAN aggregation and thus can execute the efficient cellular-WLAN aggregation.

(Second Operation of AG Entity)

Next, a second operation of the AG entity 351 will be described. The second operation of the AG entity 351 is an operation when the cellular-WLAN aggregation is under control (in progress).

Hereinafter, a case in which the UE 100 transmits the data packet (the user data) belonging to the AG data bearer to the AP 300 through the WLAN communication, and transmits a data packet belonging to a normal data bearer to the AP 300 through the WLAN communication is assumed. Here, the normal data bearer is a data bearer that is different from the AG data bearer and has involvement of the AP 300 other than the eNB 200. The normal data bearer passes through the AG entity 351 while the AG entity 351 is being established.

The eNB 200 may transmit determination information for determining the eNB 200 or a higher station (a higher entity/a higher layer) of the AP 300 as the relay destination of the data packet transmitted by the UE 100 that is performing the cellular-WLAN aggregation to the UE 100. For example, the determination information is information for changing the relay destination according to a type of data (data packet) transmitted by the UE 100. For example, the UE 100 sets the higher station of the AP 300 as the relay destination when transmission data is data that is required to be processed in real time such as audio data or video data based on the determination information (for example, when an allowable delay is a predetermined value or more), and sets the eNB 200 as the relay destination when the transmission data is other data.

The UE 100 transmits the data packet in which the higher station of the AP 300 is set as the relay destination as the data packet belonging to the normal data bearer through the WLAN communication. On the other hand, the UE 100 may transmit the data packet in which the eNB 200 is set as the relay destination as the data packet belonging to the AG data bearer through the WLAN communication or the cellular communication. The UE 100 may compare the non-transmitted data amount in the cellular communication with the non-transmitted data amount in the WLAN communication and determine whether the data packet belonging to the AG data bearer is transmitted through the WLAN communication or the cellular communication.

When the data packet received from the UE 100 that is performing the WLAN aggregation is received from the MAC entity 352, the AG entity 351 may decide the eNB 200 or the higher station (the higher entity/the higher layer) of the AP 300 as the transfer destination of the data packet based on the received data packet.

For example, the AG entity 351 analyzes a unit structure of the data packet, and decides the higher station of the AP 300 as the transfer destination when the data packet has an IP packet structure. On the other hand, the AG entity 351 decides the AeNB 20 (the PDCP layer (entity or function)) as the transfer destination when the data packet has a PDCP PDU structure. For example, the AG entity 351 can decode the header of the data packet and analyze the unit structure of the data packet.

Alternatively, the eNB 200 may transmit the determination information for deciding the transfer destination of the data packet that is transmitted by the UE 100 that is performing the cellular-WLAN aggregation to the AG entity 351 using the eNB-AP direct I/F. The AG entity 351 decides the eNB 200 or the higher station (the higher entity/the higher layer) of the AP 300 as the transfer destination of the data packet based on the determination information. Similarly to the UE 100 described above, the AG entity 351 determines the eNB 200 or the higher station (the higher entity/the higher layer) of the AP 300 as the transfer destination of the data packet.

For example, as illustrated in FIG. 13, when a plurality of data bearers (the data beare#1 and the data bearer#2) are established, the eNB 200 includes PDCP entities corresponding to a plurality of data bearers. In this case, when the transfer destination of the data packet received from the UE 100 is the eNB 200, the AG entity 351 transfers the data packet to the PDCP entity 251 (corresponding to the PDCP function 241#2 in FIG. 13) corresponding to the data bearer (the identifier of the data bearer) to which the data packet belongs. The PDCP entity 251 performs sequencing on the data packet received through the cellular communication and the data packet transferred from the AG entity 351 in the cellular-WLAN aggregation, and then transfers the resulting data packet to the higher layer.

The AG entity 351 may start the control of deciding the transfer destination of the data packet according to reception of the WLAN communication execution request (the WLAN addition request) in the cellular-WLAN aggregation for each UE 100. The AG entity 351 may end the control of deciding the transfer destination of the data packet according to reception of a WLAN communication end request (WLAN release) in the cellular-WLAN aggregation for each UE 100. When the control of deciding the transfer destination of the data packet of the UE 100 is not performed, the AG entity 351 transfers the transfer destination of the data packet received from the UE 100 to the eNB 200 or the higher station (the higher entity/the higher layer) of the AP 300.

Alternatively, when the setting information (the RRC connection reconfiguration) of the cellular-WLAN aggregation is transmitted to the UE 100, the eNB 200 includes the bearer identifier indicating the data bearer (the data bearer #2) used in the cellular-WLAN aggregation in the setting information. The eNB 200 and the AG entity 351 exchange information for setting the cellular-WLAN aggregation and share the bearer identifier indicating the data bearer #2.

The UE 100 associates the data packet to be transmitted to the AP 300 through the WLAN communication in the cellular-WLAN aggregation with the bearer identifier, and transmits the resulting the data packet to the AP 300. The AG entity 351 decides the eNB 200 as the transfer destination of the data packet associated with the bearer identifier indicating the data bearer #2. On the other hand, the AG entity 351 decides the higher station of the AP 300 as the transfer destination of the data packet associated with other bearer identifiers.

(Conclusion)

The AG entity 351 performs transmission and reception of the information related to the cellular-WLAN aggregation with the eNB 200 using the eNB-AP direct I/F. Thus, the eNB 200 need not manage the information of the AP 300 for the cellular-WLAN aggregation, and thus the load of the eNB 200 can be reduced.

Second Modified Example of Third Embodiment

Next, a second modified example of the third embodiment will be described focusing on a difference with the first to third embodiments (and the first modified example of the third embodiment). In the second modified example of the third embodiment, the WLAN GW 600 includes the AG entity 351.

For the first operation of the AG entity, when the WLAN communication execution request (the WLAN addition request) in the cellular-WLAN aggregation is received from the eNB 200, the AG entity 351 included in the WLAN GW 600 determines whether or not the WLAN communication in the cellular-WLAN aggregation is performed based on information (for example, the load information, the carrier sensing result, and the like) of each of a plurality of accommodated APs 300.

The AG entity 351 may transmit the positive response including the identifiers of all the APs 300 that can execute the WLAN communication in the cellular-WLAN aggregation to the eNB 200. The AG entity 351 may transmit the positive response including the identifiers of some of a plurality of APs 300 that can execute the WLAN communication in the cellular-WLAN aggregation to the eNB 200.

The AG entity 351 can transmit the positive response including information indicating at least one of the identifier of the AP 300 to be connected with the UE 100 serving as the cellular-WLAN aggregation target among a plurality of APs 300 and the WLAN frequency band to be used by the UE 100 to the eNB 200.

The eNB 200 transmits the setting message including the identifier of the AP 300 included in the positive response to the UE 100. The UE 100 transmits the connection request to the AP 300 corresponding to the identifier of the AP 300. When the collation information is included in the connection request, the AP 300 transmits the collation information to the WLAN GW 600. The AG entity 351 determines whether or not the collation information stored in the WLAN GW 600 is identical to the collation information received from the AP 300. When the UE 100 of the transmission source of the connection request is determined to be the cellular-WLAN aggregation target, the AG entity 351 starts the control of the cellular-WLAN aggregation.

For the second operation of the AG entity, when the data packet is received from the UE 100, the AP 300 transmits the data packet to the WLAN GW 600. The WLAN GW 600 receives the data packet of the UE 100 from the AP 300.

The AG entity 351 decides the eNB 200 or the higher station of the WLAN GW 600 as the transfer destination of the data packet based on the data packet of the UE 100. The AG entity 351 can decide the transfer destination, similarly to the first modified example of the third embodiment. When all of the accommodated APs 300 do not perform the WLAN communication in the cellular-WLAN aggregation, the AG entity 351 uniformly decides the higher station of the WLAN GW 600 as the transfer destination of the data packet.

OTHER EMBODIMENTS

In the first embodiment, the eNB 200 acquires the load information using the eNB-AP direct I/F, but the present disclosure is not limited thereto. The eNB 200 may acquire the load information via the core network.

In the first embodiment (and the first and second modified examples), when at least one of the off load control and the on load control is decided to be performed, the eNB 200 can transmit the RRC connection reconfiguration message including the setting information set for the off load control and the on load control to the UE 100 based on the load information of the AP 300, other information acquired from the AP 300, the measurement report related to the radio signal of the AP 300 acquired from the UE 100, and the measurement report related to the radio signal of the eNB 200 acquired from the UE 100.

The third embodiment has been described in connection with the downlink data transmission. However, the present disclosure is not limited to the downlink data transmission and applicable to uplink data transmission.

In the third embodiment, data is transmitted and received in the PDCP packet state encapsulated in the IP packet in the data bearer #2 between the eNB 200 and the AP 300. A packet other than the PDCP packet may be encapsulated in the IP packet.

For example, the eNB 200 may distribute data (a RLC packet) belonging to the data bearer #2 to the MAC function 243 and the AP 300 in the RLC function 24#2. The data distributed to the MAC function 243 is transmitted to the UE 100 through the MAC function 243. The UE 100 process the data belonging to the data bearer #2 through the MAC function 161 and the RLC function 162#2 in the described order.

The data (the RLC packet) distributed to the AP 300 is encapsulated in the IP packet in the eNB 200 (or the WLAN GW 600) and transferred to the AP 300. The data may be encapsulated in the IP packet in the AG entity 351. The AP 300 transmits the IP packet to the UE 100 through the LLC function 341, the MAC LME function 342, and the PHY LME function 343. The UE 100 processes the data belonging to the data bearer #2 in the order of the PHY/MAC function 164 and the LLC function 165, decapsulates the IP packet, and acquires the RLC packet. The RLC packet is reconstructed in the RLC function 162#2 together with the RLC packet transmitted from the MAC function 161.

The eNB 200 may distributes data (MAC packet) belonging to the data bearer #2 to the UE 100 and the AP 300 in the MAC function 243. The data distributed to the UE 100 is transmitted to the UE 100. On the other hand, the data (MAC packet) distributed to the AP 300 is encapsulated in the IP packet in the eNB 200 (or the WLAN GW 600) and transferred to the AP 300. The data may be encapsulated in the IP packet in the AG entity 351. The AP 300 transmits the IP packet to the UE 100 through the MAC LME function 342 and the PHY LME function 343. The UE 100 processes the data belonging to the data bearer #2 through the PHY/MAC function 164, decapsulates the IP packet, and acquires the MAC packet. The MAC packet is processed in the RLC function 162#2 together with the MAC packet transmitted from the eNB 200.

Thus, the IP tunneling is established in the WLAN interval by encapsulating/decapsulating the RLC packet or the MAC packet. As a result, in the data bearer#2, data is transmitted and received in the state in which either of the RLC packet and the MAC packet is encapsulated in the IP packet.

As the UE 100 performs the inverse process, in the uplink data transmission, in the data bearer#2, data may be transmitted and received in the state in which one of the PDCP packet, the RLC packet, and the MAC packet is encapsulated in the IP packet.

In the first modified example of the third embodiment, the AP 300 includes the AG entity 351, but the present disclosure is not limited thereto. The MAC entity 352 included in the AP 300 may perform the function of the AG entity 351. In this case, the eNB-AP direct I/F may be set between the MAC entity 351 of the AP 300 and the MAC entity 253 of the eNB 200. For example, the eNB 200 may include the AG entity 351 when the eNB 200 is a cellular-WLAN integrated eNB 200.

In the first modified example of the third embodiment, the eNB-AP direct I/F is established between the AG entity 351 and the PDCP entity 251, but the eNB-AP direct I/F may be set between the AG entity 351 and the RLC entity 252.

In the second modified example of the third embodiment, the WLAN GW 600 includes the AG entity 351, but the present disclosure is not limited thereto. A communication apparatus (an access controller (AC)) that controls a plurality of APs 300 may include the AG entity 351.

As described above, it will be understood that the AG entity 351 may be generated in the eNB 200, the WLAN GW 600, or the AP 300.

In the above embodiments, the LTE system has been described as an example of the cellular communication system, but the present disclosure is not limited to the LTE system and may be applied to any other cellular communication system than the LTE system.

The invention claimed is:
1. A cellular base station comprising:
a controller configured to perform communications with a wireless local area network (WLAN) management apparatus that manages WLAN access points,
wherein the WLAN management apparatus is used for a cellular-WLAN aggregation in which data of a user terminal is transmitted and received using both a cellular communication and a WLAN communication while the user terminal maintains a radio resource control (RRC) connection with the cellular base station,
a direct communication path bypassing a core network is established between the cellular base station and the WLAN management apparatus,
the controller comprises:
a packet data convergence protocol (PDCP) entity configured to generate PDCP packets by ciphering data of a specific bearer to be used for the cellular-WLAN aggregation;
a radio link control (RLC) entity positioned as a cellular lower layer than the PDCP entity; and
a capsulation entity,
wherein the PDCP entity is further configured to selectively provide one of the RLC entity and the capsulation entity with PDCP packets, and
the capsulation entity is configured to encapsulate the provided PDCP packets, and to use the direct commu- nication path to transmit the encapsulated PDCP packets to the WLAN management apparatus.

2. A device provided in a cellular base station comprising:
a processor and a memory, the processor configured to
  perform communications with a wireless local area network (WLAN) management apparatus that manages WLAN access points,
wherein the WLAN management apparatus is used for a cellular-WLAN aggregation in which data of a user terminal is transmitted and received using both a cellular communication and a WLAN communication while the user terminal maintains a radio resource control (RRC) connection with the cellular base station,
a direct communication path bypassing a core network is established between the cellular base station and the WLAN management apparatus,
the processor comprises:
  a packet data convergence protocol (PDCP) entity configured to generate PDCP packets by ciphering data of a specific bearer to be used for the cellular-WLAN aggregation;
  a radio link control (RLC) entity positioned as a cellular lower layer than the PDCP entity; and
  a capsulation entity,
wherein the PDCP entity is further configured to selectively provide one of the RLC entity and the capsulation entity with PDCP packets, and
the capsulation entity is configured to encapsulate the provided PDCP packets, and to use the direct communication path to transmit the encapsulated PDCP packets to the WLAN management apparatus.

3. A method performed at a cellular base station comprising:
performing communications with a wireless local area network (WLAN) management apparatus that manages WLAN access points, wherein the WLAN management apparatus is used for a cellular-WLAN aggregation in which data of a user terminal is transmitted and received using both a cellular communication and a WLAN communication while the user terminal maintains a radio resource control (RRC) connection with the cellular base station, and wherein a direct communication path bypassing a core network is established between the cellular base station and the WLAN management apparatus;
generating, at a packet data convergence protocol (PDCP) entity of the cellular base station, PDCP packets by ciphering data of a specific bearer to be used for the cellular-WLAN aggregation;
selectively providing, at the PDCP entity, one of a radio link control (RLC) entity and a capsulation entity with PDCP packets, the RLC entity positioned as a cellular lower layer than the PDCP entity;
encapsulating, at the capsulation entity, the provided PDCP packets; and
using, at the capsulation entity, the direct communication path to transmit the encapsulated PDCP packets to the WLAN management apparatus.

* * * * *